US 12,415,266 B2

(12) United States Patent
Handa et al.

(10) Patent No.: US 12,415,266 B2
(45) Date of Patent: Sep. 16, 2025

(54) ARTICULATED ROBOT, METHOD FOR CONTROLLING ARTICULATED ROBOT, ROBOT SYSTEM, AND METHOD FOR MANUFACTURING OBJECT

(71) Applicants: LAUREL BANK MACHINES CO., LTD., Tokyo (JP); LAUREL PRECISION CO., LTD., Osaka (JP)

(72) Inventors: Tomohide Handa, Tokyo (JP); Shinichi Inada, Tokyo (JP); Ryo Tanaka, Tokyo (JP)

(73) Assignees: LAUREL BANK MACHINES CO., LTD., Tokyo (JP); LAUREL PRECISION CO., LTD., Osaka (JP)

( * ) Notice: Subject to any disclaimer, the term of this patent is extended or adjusted under 35 U.S.C. 154(b) by 0 days.

(21) Appl. No.: 18/884,277

(22) Filed: Sep. 13, 2024

(65) Prior Publication Data

US 2025/0001590 A1    Jan. 2, 2025

Related U.S. Application Data

(63) Continuation of application No. PCT/JP2023/029628, filed on Aug. 16, 2023.

(51) Int. Cl.
*B25J 9/04* (2006.01)

(52) U.S. Cl.
CPC ................... *B25J 9/041* (2013.01)

(58) Field of Classification Search
CPC .......... B25J 9/041; B25J 9/045; B25J 9/046
See application file for complete search history.

(56) References Cited

U.S. PATENT DOCUMENTS 4,187,051 A * 2/1980 Kirsch ............. B25J 9/041
 901/17
4,449,884 A * 5/1984 Motoda ............ B25J 9/10
 212/75

(Continued)

FOREIGN PATENT DOCUMENTS

CN    101590646 A    12/2009
CN    101590646 B    4/2011

(Continued)

OTHER PUBLICATIONS

International Search Report for International Application No. PCT/JP2023/029628 dated Oct. 10, 2023.

(Continued)

*Primary Examiner* — Saul Rodriguez
*Assistant Examiner* — Brendan P Tighe
(74) *Attorney, Agent, or Firm* — Sughrue Mion, PLLC

(57) ABSTRACT

An articulated robot includes a base; an end section; a plurality of links including a first link and a second link and connecting the base and the end section to each other; a first driving mechanism connecting the first link and the second link to each other and configured to rotate the second link about an axis as a first rotation axis relative to the first link, the axis as the first rotation axis forming an angle greater than a predetermined angle with a first direction in which the first link extends; a first moving mechanism configured to move the first driving mechanism relative to the first link along the first direction; and a second moving mechanism configured to move the second link relative to the first driving mechanism along a second direction in which the second link extends.

14 Claims, 14 Drawing Sheets

(56) References Cited

U.S. PATENT DOCUMENTS

| | | | | |
|---|---|---|---|---|
| 4,527,934 A | * | 7/1985 | Blaseck | G21C 19/065 |
| | | | | 901/17 |
| 4,652,204 A | * | 3/1987 | Arnett | F41H 11/16 |
| | | | | 901/17 |
| 4,664,873 A | * | 5/1987 | Hendrich | B25J 19/023 |
| | | | | 212/319 |
| 4,807,486 A | * | 2/1989 | Akeel | B25J 17/0283 |
| | | | | 901/29 |
| 5,084,951 A | | 2/1992 | Bonomi et al. | |
| 9,026,251 B2 | * | 5/2015 | Hediger | B25J 9/1676 |
| | | | | 700/258 |
| 10,335,895 B2 | * | 7/2019 | Odakura | B25J 9/1005 |
| 10,549,420 B2 | * | 2/2020 | Bonora | B25J 15/0052 |
| 2010/0290886 A1 | * | 11/2010 | Hashimoto | B25J 11/0095 |
| | | | | 414/800 |
| 2013/0297071 A1 | * | 11/2013 | Hediger | B25J 9/1674 |
| | | | | 901/49 |
| 2017/0120449 A1 | | 5/2017 | Matsunami et al. | |
| 2018/0071860 A1 | * | 3/2018 | Odakura | B23K 20/22 |
| 2019/0283244 A1 | * | 9/2019 | Bonora | B25J 13/06 |

FOREIGN PATENT DOCUMENTS

| | | |
|---|---|---|
| CN | 114750128 A | 7/2022 |
| JP | 61-136782 A | 6/1986 |
| JP | 6-143172 A | 5/1994 |
| JP | 2007-30086 A | 2/2007 |
| JP | 2008-36742 A | 2/2008 |
| JP | 2015-174185 A | 10/2015 |
| JP | 2020-187702 A | 11/2020 |
| JP | 2022-59740 A | 4/2022 |

OTHER PUBLICATIONS

Written Opinion of the International Searching Authority for International Application No. PCT/JP2023/029628 dated Oct. 10, 2023.
International Search Report issued Oct. 31, 2023 in Application No. PCT/JP2023/029630.
International Search Report issued Oct. 31, 2023 in Application No. PCT/JP2023/032690.
Communication issued Dec. 25, 2024 in Chinese Application No. 202380014888.1.
Extended European Search Report dated Mar. 17, 2025 in Application No. 23860050.6.
Communication dated Jul. 17, 2025 issued by European Patent Office in Application No. 23 860 050.6.

* cited by examiner (DEGth = 45°)

ARTICULATED ROBOT, METHOD FOR CONTROLLING ARTICULATED ROBOT, ROBOT SYSTEM, AND METHOD FOR MANUFACTURING OBJECT

CROSS REFERENCE TO RELATED APPLICATIONS

This Application is a Continuation Application of PCT Application No. PCT/JP2023/029628 filed on Aug. 16, 2023, and is based on and claims priority from Japanese Patent Application No. 2022-136863 filed on Aug. 30, 2022, and Japanese Patent Application No. 2023-118901 filed on Jul. 21, 2023, the entire contents of each of which are incorporated herein by reference.

BACKGROUND

Field of the Invention

The present invention relates to articulated robots, to methods for controlling articulated robots, to robot systems, and to methods for manufacturing objects.

Description of Related Art

An articulated robot is known as a robot that can perform humanlike actions (see Japanese Patent Application Laid-Open Publication No. S61-136782, for example).

A conventional articulated robot has a limited working area. This is because links of an arm of the robot interfere with each other, and a reachable range of the end section of the arm of the robot is thereby limited. In particular, the links easily interfere with each other in the vicinity of the base to which the arm is attached (near the root of the robot), which causes an increase in size of an area on which work cannot be performed. For a robot with two links, an angle between the two links comes close to 0°, and the links interfere with each other. Even within the working area, the end section of the arm is controlled by the respective links, which limits accuracy for controlling the end section of the arm.

SUMMARY

It is demanded that even in the vicinity of the base, the end section of the arm of the articulated robot be controlled with high accuracy without limiting the working area of the robot.

An articulated robot according to a preferred aspect of the present invention includes: a base; an end section; a plurality of links including a first link and a second link and connecting the base and the end section to each other; a first driving mechanism connecting the first link and the second link to each other and configured to rotate the second link about an axis as a first rotation axis relative to the first link, the axis as the first rotation axis forming an angle greater than a predetermined angle with a first direction in which the first link extends; a first moving mechanism configured to move the first driving mechanism relative to the first link along the first direction; and a second moving mechanism configured to move the second link relative to the first driving mechanism along a second direction in which the second link extends.

A method according to a preferred aspect of the present invention is a method for controlling an articulated robot. The articulated robot further includes: a first motor configured to drive the first driving mechanism; a second motor configured to drive the first moving mechanism; and a third motor configured to drive the second moving mechanism. The first moving mechanism includes: a first screw part disposed within the first link, extending in the first direction, and configured to rotate about an axis as a rotation axis along the first direction in association with rotation of the second motor; and a first moving part that is connected to the first driving mechanism, to which the first screw part is inserted, and that is configured to move relative to the first screw part in association with rotation of the first screw part. The second moving mechanism includes: a second screw part disposed within the second link, extending in the second direction, and configured to rotate about an axis as a rotation axis along the second direction in association with rotation of the third motor; and a second moving part that is connected to the first driving mechanism, to which the second screw part is inserted, and that is configured to move relative to the second screw part in association with rotation of the second screw part. The first driving mechanism is configured to move relative to the first link in association with movement of the first moving part. The second link is configured to move relative to the first driving mechanism in association with movement of the second moving part. A controller that controls operations of the articulated robot is configured to control the first motor, the second motor, and the third motor to control the operations of the articulated robot.

A robot system according to a preferred aspect of the present invention includes the above-mentioned articulated robot further including: a first motor configured to drive the first driving mechanism; a second motor configured to drive the first moving mechanism; and a third motor configured to drive the second moving mechanism. The first moving mechanism includes: a first screw part disposed within the first link, extending in the first direction, and configured to rotate about an axis as a rotation axis along the first direction in association with rotation of the second motor; and a first moving part that is connected to the first driving mechanism, to which the first screw part is inserted, and that is configured to move relative to the first screw part in association with rotation of the first screw part. The second moving mechanism includes: second screw part disposed within the second link, extending in the second direction, and configured to rotate about an axis as a rotation axis along the second direction in association with rotation of the third motor; and a second moving part that is connected to the first driving mechanism, to which the second screw part is inserted, and that is configured to move relative to the second screw part in association with rotation of the second screw part. The first driving mechanism is configured to move relative to the first link in association with movement of the first moving part. The second link is configured to move relative to the first driving mechanism in association with movement of the second moving part. The articulated robot further includes an end effector attached to the end section; and a controller configured to control operations of the articulated robot and the end effector. The controller is configured to control the first motor, the second motor, and the third motor to control the operations of the articulated robot.

A method for manufacturing an object according to a preferred aspect of the present invention includes assembling or removing a component by the robot system.

An articulated robot according to another preferred aspect of the present invention includes: a base; an end section; a plurality of links including a first link and a second link and connecting the base and the end section to each other; a first driving mechanism connecting the first link and the second link to each other and configured to rotate the second link relative to the first link about an axis as a first rotation axis, the axis as the first rotation axis forming an angle greater than a predetermined angle with a first direction in which the first link extends; a first moving mechanism configured to move the first driving mechanism relative to the first link along the first direction; a second moving mechanism configured to move the second link relative to the first driving mechanism along a second direction in which the second link extends; a second driving mechanism configured to rotate at least a portion of the base about an axis as a second rotation axis, the axis as the second rotation axis forming an angle equal to or less than the predetermined angle with a direction perpendicular to a bottom of the base; and a third driving mechanism connecting the base and the first link to each other and configured to rotate the first link about an axis as a third rotation axis, the axis as the third rotation axis forming an angle greater than the predetermined angle with the direction perpendicular to the bottom of the base. A direction along the first rotation axis and a direction along the third rotation axis cross at a first angle equal to or greater than the predetermined angle in plan view from the first direction.

A method according to another preferred aspect of the present invention is a method for controlling an articulated robot. The articulated robot further includes: a first motor configured to drive the first driving mechanism; a second motor configured to drive the first moving mechanism; a third motor configured to drive the second moving mechanism; a fourth motor configured to drive the second driving mechanism; and a fifth motor configured to drive the third driving mechanism. The first moving mechanism includes a first screw part disposed within the first link, extending in the first direction, and configured to rotate about an axis as a rotation axis along the first direction in association with rotation of the second motor; and a first moving part that is connected to the first driving mechanism, to which the first screw part is inserted, and that is configured to move relative to the first screw part in association with rotation of the first screw part. The second moving mechanism includes a second screw part disposed within the second link, extending in the second direction, and configured to rotate about an axis as a rotation axis along the second direction in association with rotation of the third motor; and a second moving part that is connected to the first driving mechanism, to which the second screw part is inserted, and that is configured to move relative to the second screw part in association with rotation of the second screw part. The first driving mechanism is configured to move relative to the first link in association with movement of the first moving part. The second link is configured to move relative to the first driving mechanism in association with movement of the second moving part. The first angle is substantially 90 degrees. A controller that controls operations of the articulated robot is configured to control the first motor, the second motor, and the third motor to control the operations of the articulated robot in such a manner that the end section of the articulated robot is moved along a predetermined plane.

A robot system according to another preferred aspect of the present invention includes the articulated robot. The articulated robot further includes: a first motor configured to drive the first driving mechanism; a second motor configured to drive the first moving mechanism; a third motor configured to drive the second moving mechanism; a fourth motor configured to drive the second driving mechanism; and a fifth motor configured to drive the third driving mechanism. The first moving mechanism includes: a first screw part disposed within first link, extending in the first direction, and configured to rotate about an axis as a rotation axis along the first direction in association with rotation of the second motor; and a first moving part that is connected to the first driving mechanism, to which the first screw part is inserted, and that is configured to move relative to the first screw part in association with rotation of the first screw part. The second moving mechanism includes: a second screw part disposed within second link, extending in the second direction, and configured to rotate about an axis as a rotation axis along the second direction in association with rotation of the third motor; and a second moving part that is connected to the first driving mechanism, to which the second screw part is inserted, and that is configured to move relative to the second screw part in association with rotation of the second screw part. The first driving mechanism is configured to move relative to the first link in association with movement of the first moving part. The second link is configured to move relative to the first driving mechanism in association with movement of the second moving part. The first angle is substantially 90 degrees. The articulated robot further includes: an end effector attached to the end section; and a controller configured to control operations of the articulated robot and the end effector. The controller is configured to control the first motor, the second motor, the third motor, the fourth motor, and the fifth motor to control the operations of the articulated robot.

A method for manufacturing an object according to another preferred aspect of the present invention includes assembling or removing a component by the robot system.

According to the present invention, a movement of an end section of a robot to the vicinity of a base is achieved by simple control.

MODES FOR CARRYING OUT THE INVENTION

Figure 1:
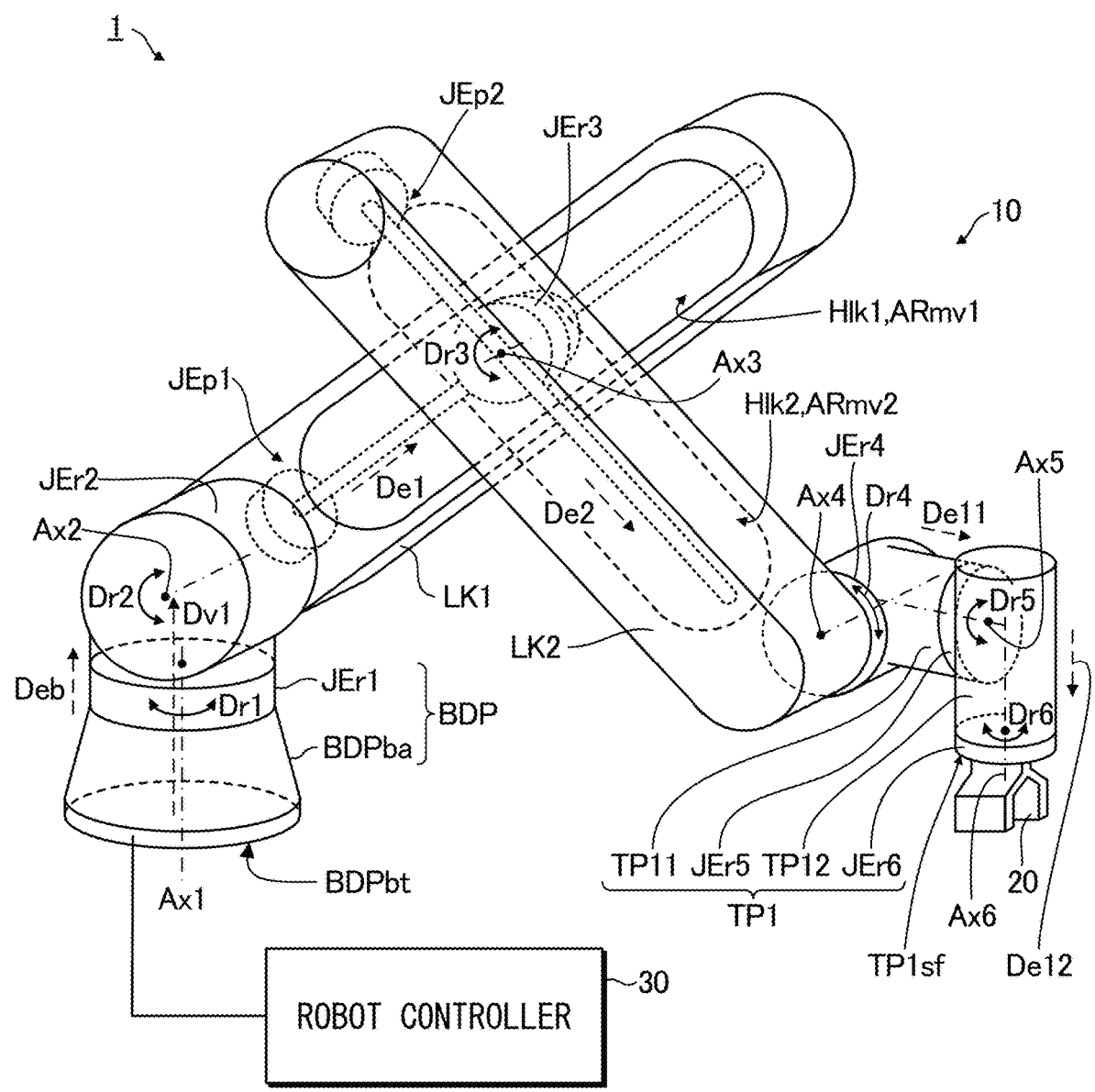
FIG. 1 is an explanatory diagram for an outline of a robot system according to a first embodiment.

Description will be given of embodiments according to the present invention with reference to the drawings. The dimensions and scales of respective parts in the drawings are different from those of actual products, as appropriate. Since the embodiments described below are preferred specific examples of the present invention, various technically preferred limitations are added thereto. However, the scope of the present invention is not limited to these embodiments unless otherwise stated in the following explanations that the present invention is specifically limited thereto.

1. First Embodiment

First, an example will be given of the outline of a robot system 1 according to a first embodiment with reference to FIG. 1.

FIG. 1 is an explanatory diagram for explaining an outline of the robot system 1 according to the first embodiment.

The robot system 1 includes, for example, a robot 10, an end effector 20 attached to the robot 10 to be detachable, and a robot controller 30 controlling operations of the robot 10 and the end effector 20. The robot 10 is an example of an "articulated robot," and the robot controller 30 is an example of a "controller."

The robot 10 and the robot controller 30 are connected to be able to communicate with each other by, for example, wired connection. Connection between the robot 10 and the robot controller 30 may be a wireless connection, or the connection using both a wired connection and a wireless connection may be employed. The robot controller 30 communicates with the end effector 20 attached to the robot 10. Any information processor that communicates with other devices may be employed as the robot controller 30. The configuration of the robot controller 30 will be described later with reference to FIG. 6.

The robot 10 is an articulated robot used for work in farms or in factories or warehouses. Specifically, the robot 10 is an 8-axis articulated robot in which two joint mechanisms JEp (JEp1 and JEp2) corresponding to prismatic joints are added to a 6-axis articulated robot having six joint mechanisms JEr (JEr1, JEr2, JEr3, JEr4, JEr5, and JEr6) corresponding to rotary joints. For example, the robot 10 includes the six joint mechanisms JEr, the two joint mechanisms JEp, a base body BDP, two links LK (LK1 and LK2), and an end section TP1. In the example shown in FIG. 1, the joint mechanism JEr1 is included in the base body BDP, and the joint mechanisms JEr5 and JEr6 are included in the end section TP1. The joint mechanism JEp1 is provided in the link LK1, and the joint mechanism JEp2 is provided in the link LK2. In the following description, the joint mechanisms JEr and JEp are not particularly distinguished from each other, and they may also be called joint mechanisms JE. For example, the robot 10 further includes a plurality of motors driving the joint mechanisms JE. In FIG. 1, the motors driving the joint mechanisms JE and a reducer and an encoder provided for each motor are not illustrated for clarity of illustration.

The base body BDP is an example of the "base." The link LK1 is an example of a "first link," and the link LK2 is an example of a "second link." As a result, the links LK1 and LK2 correspond to "a plurality of links." For example, the links LK1 and LK2 connect the base body BDP and the end section TP1 to each other.

For example, connection between members includes both direct connection between two members and indirect connection between the two members. Direct connection between the two members includes (i) a state in which the two members are in contact with each other, and (ii) a state that is regarded as the same state denoted (i), which is the state in which the two members are in contact with each other. The state denoted as (ii) is, for example, a state in which one of the two members is fixed to the other with adhesive or the like. Indirect connection between the two members means that another member is disposed between the two members.

The joint mechanism JEr1 is an example of a "second driving mechanism," and the joint mechanism JEr2 is an example of a "third driving mechanism." The joint mechanism JEr3 is an example of a "first driving mechanism," and the joint mechanism JEr4 is an example of a "fourth driving mechanism." The joint mechanism JEr5 is an example of a "fifth driving mechanism," and the joint mechanism JEr6 is an example of a "sixth driving mechanism." The joint mechanism JEp1 is an example of a "first moving mechanism," and the joint mechanism JEp2 is an example of a "second moving mechanism."

The base body BDP includes, for example, a base part BDPba fixed to a predetermined place (e.g., floor) and the joint mechanism JEr1 connected to the joint mechanism JEr2. The joint mechanism JEr1 rotates a portion of the base body BDP about an axis Ax1 (as a rotation axis) perpendicular to a bottom BDPbt of the base body BDP. For example, the joint mechanism JEr1 includes a portion connected to the joint mechanism JEr2. The joint mechanism JEr1 rotates the outer wall of the joint mechanism JEr1 including such a portion relative to the base part BDPba about the axis Ax1 as a rotation axis. That is, the joint mechanism JEr1 rotates joint mechanism JEr2 relative to the base body BDP about the axis Ax1 as a rotation axis. The axis Ax1 is an example of a "second rotation axis."

The term "perpendicular" used here includes not only "exactly perpendicular" but also "substantially perpendicular" (for example, perpendicular within an error range). Similarly, the term "parallel" described later includes not only "exactly parallel" but also "substantially parallel" (for example, parallel within an error range). A rotational direction Dr1 in FIG. 1 indicates the rotational direction of the portion of the base body BDP when the portion of the base body BDP is rotated about the axis Ax1 as a rotation axis.

The joint mechanism JEr2 connects the base body BDP and the link LK1 to each other. The joint mechanism JEr2 rotates the link LK1 relative to the base body BDP about an axis Ax2 as a rotation axis. The axis Ax2 is parallel to the bottom BDPbt of the base body BDP. A rotational direction Dr2 in FIG. 1 indicates the rotational direction of the link LK1 when the link LK1 is rotated about the axis Ax2 as a rotation axis. The axis Ax2 is an example of a "third rotation axis."

The link LK1 is hollow and formed to be long, for example. The link LK1 has an opening Hlk1 extending in a direction De1 in which the link LK1 extends. The direction De1 is an example of a "first direction."

The opening Hlk1 is formed in, for example, a surface of the link LK1 which includes a portion opposed to the link LK2. Inside the link LK1, a portion of the joint mechanism JEr3 and the joint mechanism JEp1 are provided. For example, a portion of the joint mechanism JEr3 is located inside the link LK1, and the remaining portion of the joint mechanism JEr3 protrudes from the opening Hlk1 to the outside of the link LK1. The portion of the joint mechanism JEr3 located outside the link LK1 or a portion of that portion passes through an opening Hlk2 of the link LK2, which will be described later, and is located inside the link LK2.

The link LK1 is rotated relative to the base body BDP about the axis Ax1 as a rotation axis by the joint mechanism JEr1. Additionally, the link LK1 is rotated relative to the base body BDP about the axis Ax2 as a rotation axis by the joint mechanism JEr2.

The joint mechanism JEr3 connects the link LK1 and the link LK2 to each other. The joint mechanism JEr3 rotates the link LK2 relative to the link LK1 about an axis Ax3 as a rotation axis. The axis Ax3 is perpendicular to the direction De1 in which the link LK1 extends. A rotational direction Dr3 shown in FIG. 1 indicates the rotational direction of the link LK2 when the link LK2 is rotated about the axis Ax3 as a rotation axis. The axis Ax3 is an example of a "first rotation axis."

The joint mechanism JEp1 moves the joint mechanism JEr3 relative to the link LK1 along the direction De1. The movement of the joint mechanism JEr3 along the direction De1 causes the link LK2 to be moved along the direction De1 relative to the link LK1. In the example shown in FIG. 1, when the joint mechanism JEp1 moves the joint mechanism JEr3 along the direction De1, the opening Hlk1 of the link LK1 corresponds to a movable area ARmv1 for the joint mechanism JEr3.

The link LK2 is hollow and formed to be long, for example. The link LK2 has the opening Hlk2 extending in a direction De2 in which the link LK2 extends. The direction De2 is an example of a "second direction."

The opening Hlk2 is formed in, for example, a surface of the link LK2 which includes a portion opposed to the link LK1. A portion of the joint mechanism JEr3 and the joint mechanism JEp2 are provided inside the link LK2. For example, a portion of the joint mechanism JEr3 is located inside the link LK2. The remaining portion of the joint mechanism JEr3 protrudes from the opening Hlk2 to the outside of the link LK2.

The joint mechanism JEp2 moves the link LK2 relative to the joint mechanism JEr3 along the direction De2 in which the link LK2 extends. Such a movement causes the link LK2 to be moved along the direction De2 relative to the joint mechanism JEr3. That is, the link LK2 is moved along the direction De2 relative to the link LK1.

Thus, the link LK2 is moved along the direction De1 relative to the link LK1 by the joint mechanism JEp1 and is moved along the direction De2 relative to the link LK1 by the joint mechanism JEp2.

Movement of the link LK2 relative to the joint mechanism JEr3 may be paraphrased as movement of the joint mechanism JEr3 relative to the link LK2. The joint mechanism JEp2 is also considered as the joint mechanism JE that moves the joint mechanism JEr3 relative to the link LK2 along the direction De2. In the example shown in FIG. 1, when the joint mechanism JEp2 moves the joint mechanism JEr3 relative to the link LK2 along the direction De2, the opening Hlk2 of the link LK2 corresponds to a movable area ARmv2 in which the joint mechanism JEr3 is movable.

The joint mechanism JEr4 connects the link LK2 and the end section TP1 to each other. The joint mechanism JEr4 rotates the end section TP1 relative to the link LK2 about an axis Ax4 as a rotation axis. The axis Ax4 is perpendicular to the direction De2. A rotational direction Dr4 in FIG. 1 indicates the rotational direction of the end section TP1 when the end section TP1 is rotated about the axis Ax4 as a rotation axis. The axis Ax4 is an example of a "fourth rotation axis."

For example, the end effector 20 for holding an object (product) is attached to the end section TP1. The end effector 20 is attached to, for example, an end surface TP1sf of the end section TP1. The end section TP1 includes a first portion TP11 connected to the link LK2, a second portion TP12 connected to the first portion TP11, the joint mechanism JEr5, and the joint mechanism JEr6. The first portion TP11 is connected to the link LK2, for example, via the joint mechanism JEr4. As a result, the first portion TP11 is rotated relative to the link LK2 about the axis Ax4 as a rotation axis.

The joint mechanism JEr5 connects the first portion TP11 and the second portion TP12 to each other. The joint mechanism JEr5 rotates the second portion TP12 relative to the first portion TP11 about an axis Ax5 as a rotation axis. The axis Ax5 is perpendicular to the axis Ax4. A rotational direction Dr5 shown in FIG. 1 indicates the rotational direction of the second portion TP12 when the second portion TP12 is rotated about the axis Ax5 as a rotation axis. The axis Ax5 is an example of a "fifth rotation axis."

The joint mechanism JEr6 rotates at least a portion of the end section TP1 about an axis Ax6 as a rotation axis. The axis Ax6 is perpendicular to the axis Ax5. In the example shown in FIG. 1, the joint mechanism JEr6 rotates the end surface TP1sf of the end section TP1 about the axis Ax6 as a rotation axis. That is, the joint mechanism JEr6 rotates a portion (the end surface TP1sf) of the end section TP1, to which the end effector 20 is attached, about the axis Ax6 as a rotation axis. A rotational direction Dr6 shown in FIG. 1 indicates the rotational direction of the end surface TP1sf when the end surface TP1sf is rotated about the axis Ax6. The axis Ax6 is an example of a "sixth rotation axis."

In the example shown in FIG. 1, a surface of the joint mechanism JEr6 corresponds to the end surface TP1sf. In a configuration in which the joint mechanism JEr6 is included in the second portion TP12 or the like, an end surface of the second portion TP12 may be the end surface TP1sf.

Work with the end effector 20 is not limited to holding objects. The end effector 20 may include an appropriate unit (e.g., a robot hand and a robot finger) in accordance with the purpose of work of the robot 10. That is, end effectors 20 suitable for a variety of types of tasks are attached to the end section TP1.

In the present embodiment, there are two types of rotations, one of which is rotation about an axis (as a rotation axis) that forms an angle greater than a predetermined angle with a specific direction, and the other is rotation about an axis (a rotation axis) that forms an angle equal to or less than the predetermined angle with the specific direction. The former angle may be described as "turning" to distinguish from the latter angle. The predetermined angle may be 45°; however, it is not limited to 45°.

For example, for rotation about the axis Ax1 and rotation about the axis Ax2 (as a rotation axis), a direction Dv1 perpendicular to the bottom BDPbt of the base body BDP corresponds to the specific direction. In this case, the axis Ax1 corresponds to the axis that forms an angle equal to or less than the predetermined angle with the direction Dv1 perpendicular to the bottom BDPbt of the base body BDP. The axis Ax2 corresponds to the axis that forms an angle greater than the predetermined angle with the direction Dv1. As a result, rotation of the link LK1 about the axis Ax2 means "turning." In the present embodiment, a direction Deb in which the base body BDP extends may be the specific direction because the base body BDP extends along the direction Dv1 perpendicular to the bottom BDPbt.

For rotation about the axis Ax3 (as a rotation axis), the direction De1 in which the link LK1 extends corresponds to the specific direction. For rotation about the axis Ax4, the direction De2 in which the link LK2 extends corresponds to the specific direction. In these cases, the axis Ax3 corresponds to the axis that forms an angle greater than the predetermined angle with the direction De1 in which the link LK1 extends. The axis Ax4 corresponds to the axis that forms an angle greater than the predetermined angle with the direction De2 in which the link LK2 extends. For these reasons, rotation of the link LK2 about the axis Ax3 and rotation of the first portion TP11 about the axis Ax4 mean "turning."

For rotation about the axis Ax5 (as a rotation axis), a direction De11 corresponds to the specific direction. For rotation about the axis Ax6 (as a rotation axis), a direction De12 corresponds to the specific direction. The first portion TP11 has a predetermined end to which the joint mechanism JEr5 is connected and an end opposite to the predetermined end, and the direction De11 refers to a direction from the opposite end to the predetermined end. The direction De11 may be considered as the direction in which the first portion TP11 extends. The second portion TP12 has a predetermined end (the end including the end surface TP1sf) to which the joint mechanism JEr6 is connected and an end opposite to the predetermined end, and the direction De12 refers to a direction from the opposite end to the predetermined end. The direction De12 may be considered as the direction in which the second portion TP12 extends.

When the direction De11 is the specific direction, the axis Ax5 corresponds to the axis that forms an angle equal to or less than the predetermined angle with the direction De11. When the direction De12 is the specific direction, the axis Ax6 corresponds to the axis that forms an angle equal to or less than the predetermined angle with the direction De12. In the present embodiment, it is envisaged that the direction De11 is perpendicular to the axis Ax4, and the direction De12 is perpendicular to the axis Ax5. In this case, the axis Ax5, which forms an angle equal to or less than the predetermined angle with the direction De11, corresponds to the axis that forms an angle greater than the predetermined angle with the axis Ax4. The axis Ax6, which forms an angle equal to or less than the predetermined angle with the direction De12, corresponds to the axis that forms an angle greater than the predetermined angle with the axis Ax5.

Thus, in the present embodiment, each portion of the robot 10 (the base body BDP, the link LK1, the link LK2, the end section TP1, and the like) is rotated about a corresponding axis (as a rotational axis) Ax1, Ax2, Ax3, Ax4, Ax5, and Ax6. In the present embodiment, such rotations allow for the robot 10 to perform substantially the same actions as those of humans.

For example, the link LK1 between the joint mechanism JEr2 and the joint mechanism JEr3 corresponds to the upper arm. The link LK2 between the joint mechanism JEr3 and the joint mechanism JEr4 corresponds to the forearm. The joint mechanism JEr1 enables the robot 10 to imitate human waist twisting, and the joint mechanism JEr2 enables it to imitate turning of its shoulder. Furthermore, the joint mechanism JEr3 enables the robot 10 to imitate turning of its elbow, and the joint mechanism JEr4 enables it to imitate turning of its wrist. The joint mechanism JEr5 enables the robot 10 to imitate wrist twisting, and the joint mechanism JEr6 enables it to imitate twisting of a fingertip.

In the present embodiment, the joint mechanism JEp1 provided in the link LK1 enables the link LK2 to be moved relative to the link LK1 along the direction De1 in which the link LK1 extends. In the present embodiment, the joint mechanism JEp2 provided in the link LK2 enables the link LK2 to be moved relative to the link LK1 along the direction De2 in which the link LK2 extends. As a result, in the present embodiment, the joint mechanisms JEp1 and JEp2 enable the end section TP1 of the robot 10 to be moved to the vicinity of the base body BDP. In the present embodiment, the joint mechanisms JEp1 and JEp2 enlarge a reachable range for the end section TP1 (in more detail, the end surface TP1sf), which enlarges a reachable range for the end effector 20 attached to the robot 10 as well.

The configuration of the robot system 1 is not limited to the example shown in FIG. 1. For example, the robot controller 30 may be built in the robot 10. Although an example is given in which the robot 10 is fixed to a predetermined place (e.g., floor) shown in FIG. 1, the robot 10 is not necessarily fixed to a predetermined place and may be movable. The base part BDPba of the base body BDP may be fixed to the predetermined place (e.g., floor) via the joint mechanism JEr1. In this case, the base body BDP may be defined not to include the joint mechanism JEr1. In the configuration in which the base part BDPba is fixed to the predetermined place via the joint mechanism JEr1, the joint mechanism JEr1 may rotate the base part BDPba about the axis Ax1 as a rotation axis. In the configuration in which the base part BDPba is fixed to the predetermined place via the joint mechanism JEr1, the base part BDPba may be connected to the joint mechanism JEr2.

Next, an example of the joint mechanisms JEp1 and JEp2 will be described with reference to FIG. 2.

Figure 2:
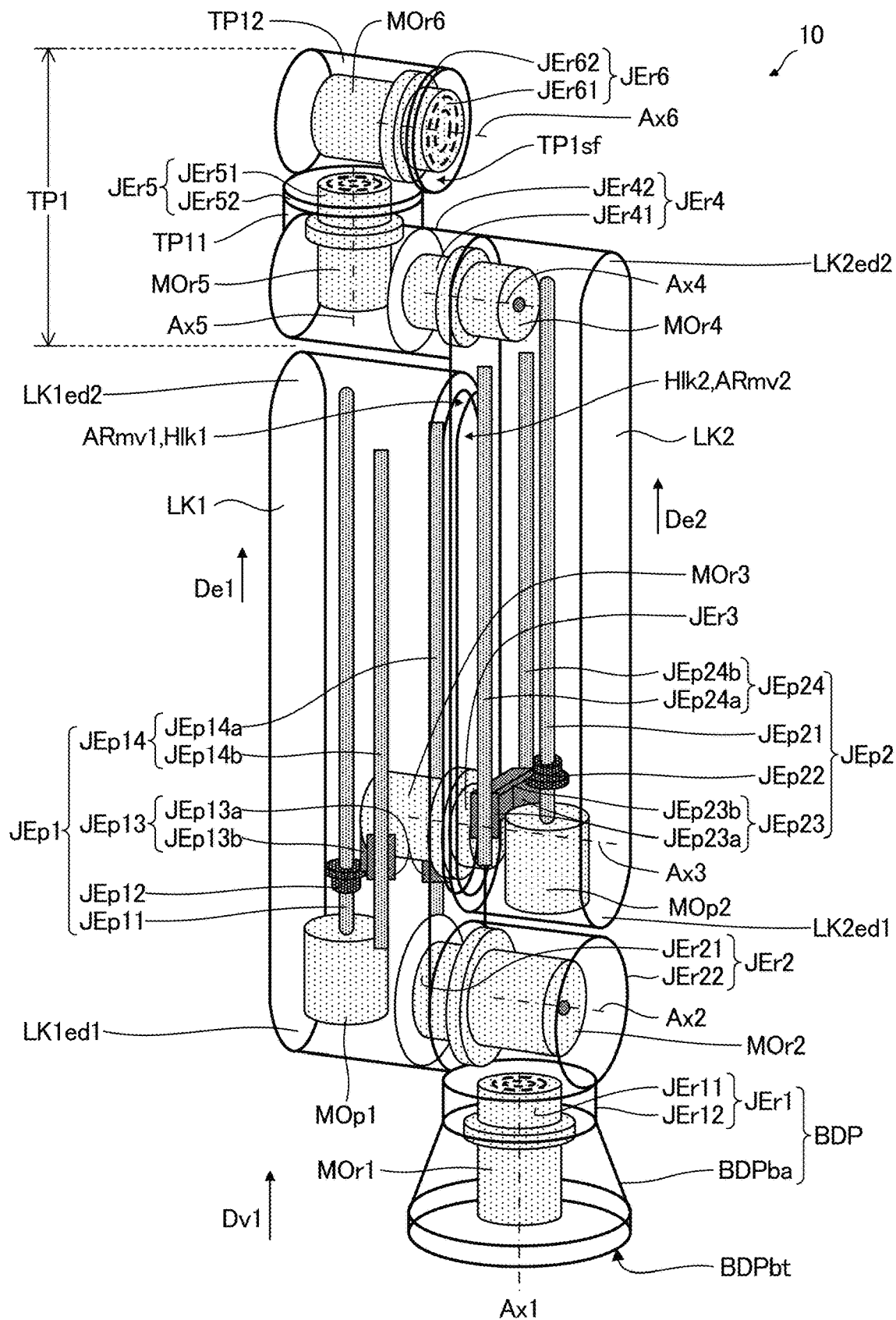
FIG. 2 is an explanatory diagram for an example of joint mechanisms.

FIG. 2 is an explanatory diagram for an example of the joint mechanisms JE. In FIG. 2, the joint mechanisms JEp1 and JEp2 and the joint mechanism JEr3 are mainly described. In the present embodiment, it is envisaged that a motor MOr3 driving the joint mechanism JEr3 is moved integrally with the joint mechanism JEr3. For example, the motor MOr3 may be fixed to the joint mechanism JEr3. The motor MOr3 is an example of a "first motor." First, the joint mechanism JEp1 is described.

The joint mechanism JEp1 and a motor MOp1 driving the joint mechanism JEp1 are arranged inside the link LK1. For example, the motor MOp1 is attached inside the link LK1 at one end LK1ed1 of two ends LK1ed (LK1ed1 and LK1ed2) of the link LK1, where the end LK1ed1 is a closer end to the base body BDP. The motor MOp1 is an example of a "second motor." The end LK1ed2 is the farther end LK1ed of the two ends LK1ed of the link LK1 from the base body BDP.

The joint mechanism JEp1 includes a screw part JEp11 extending along the direction De1, a nut JEp12, a connection part JEp13, and a rail JEp14. The screw part JEp11 is an example of a "first screw." The nut JEp12 is an example of a "first moving part."

One end of the screw part JEp11 is attached to the motor MOp1. For example, the screw part JEp11 is inserted through the nut JEp12 and is attached to the motor MOp1 in a state in which the center axis of the screw part JEp11 (the center axis along the direction De1) is coincident with the rotation axis of the motor MOp1. Rotation of the motor MOp1 causes the screw part JEp11 to be rotated about its center axis (as a rotation axis) along the direction De1.

The connection part JEp13 includes a slider part JEp13a connected to the rail JEp14 to be movable along the direction De1 and a support JEp13b supporting the nut JEp12 and the motor MOr3. For example, the nut JEp12 is fixed to the support JEp13*b* so as not to rotate together with the screw part JEp11. The motor MOr3 is fixed to the support JEp13*b* in such a manner that the motor MOr3 itself does not revolve.

It is also allowable that the slider part JEp13*a* and the support JEp13*b* not be strictly distinguished from each other. For example, the motor MOr3 may be fixed to the slider part JEp13*a*. The nut JEp12 may be fixed to the motor MOr3 via other than the support JEp13*b*. That is, the nut JEp12 may be connected to the connection part JEp13 or the like in such a manner that the position of the nut JEp12 relative to the joint mechanism JEr3 remains unchanged. Thus, the nut JEp12 is connected to the joint mechanism JEr3 via the connection part JEp13 or the like.

The rail JEp14 extends along the direction De1 and includes two rod-shaped members JEp14*a* and JEp14*b* arranged parallel to each other. The shape of each of the rod-shaped members JEp14*a* and JEp14*b* and the slider part JEp13*a* is not limited to any particular shape, as long as the slider part JEp13*a* is supported by the rod-shaped members JEp14*a* and JEp14*b*. The rail JEp14 is disposed between the opening Hlk1 and the screw part JEp11 in the direction along the axis Ax3 and is attached inside the link LK1. The rail JEp14 is not necessarily disposed between the opening Hlk1 and the screw part JEp11 in the direction along the axis Ax3, as long as the joint mechanism JEr3 is movable along the direction De1 with a portion of the joint mechanism JEr3 protruding from the opening Hlk1. In the present embodiment, it is envisaged that the straight line along the axis Ax3 and the straight line along the axis Ax2 are parallel to each other in plan view from the direction De1. For this reason, the "direction along the axis Ax3" may be read as the "direction along the axis Ax2."

Since the nut JEp12 is fixed to the connection part JEp13 so as not to rotate together with the screw part JEp11, rotation of the screw part JEp11 causes the nut JEp12 to be moved relative to the screw part JEp11 along the direction De1. As described above, the nut JEp12 is fixed to the connection part JEp13 or the like in such a manner that the position of the nut JEp12 relative to the joint mechanism JEr3 remains unchanged. That is, the joint mechanism JEr3 is moved together with the nut JEp12 along the direction De1. For example, the joint mechanism JEr3 is moved relative to the link LK1 in association with movement of the nut JEp12. Thus, the joint mechanism JEp1 supports the joint mechanism JEr3 to allow the joint mechanism JEr3 to be moved. The movable area ARmv1 (movable range) of the joint mechanism JEr3 is preferably set in such a manner that the joint mechanism JEr3 is movable between two areas, one of which is an area closer to the end LK1*ed*1 of the link LK1 than to the end LK1*ed*2, and the other is an area closer to the end LK1*ed*2 than to the end LK1*ed*1. This setting enables the substantial length (control length) of the link LK1 to be equal to or less than half of the length of the link LK1. Alternatively, it may be equal to or greater than half of the length of the link LK1. The substantial length of the link LK1 is, for example, the length along the direction De1 from the end LK1*ed*1 (e.g., the intersection of the link LK1 and the axis Ax2) to the joint mechanism JEr3 (more exactly, the axis Ax3).

Switching the rotational direction of the motor MOp1 causes the direction in which the nut JEp12 is moved (i.e., the direction in which the joint mechanism JEr3 is moved) to be switched between the direction De1 and the direction opposite to the direction De1. For example, when the motor MOp1 is rotated in a first rotational direction, the nut JEp12 is moved in the direction De1. When the motor MOp1 is rotated in a second rotational direction opposite to the first direction, the nut JEp12 is moved in the opposite direction to the direction De1. Next, the joint mechanism JEp2 will be described.

The joint mechanism JEp2 and a motor MOp2 driving the joint mechanism JEp2 are disposed within the link LK2. For example, the motor MOp2 is attached inside the link LK2 at an end LK2*ed*1 of two ends LK2*ed* (LK2*ed*1 and LK2*ed*2) of the link LK2, where the end LK2*ed*1 is a farther end from the end section TP1. The motor MOp2 is an example of a "third motor." The end LK2*ed*2 refers to the end LK2*ed* closer to the end section TP1 between the two ends LK2*ed* of the link LK2.

The joint mechanism JEp2 includes a screw part JEp21 extending along the direction De2, a nut JEp22, a connection part JEp23, and a rail JEp24. The screw part JEp21 is an example of a "second screw." The nut JEp22 is an example of a "second moving part."

One end of the screw part JEp21 is attached to the motor MOp2. For example, the screw part JEp21 is inserted through the nut JEp22 and is attached to the motor MOp2 in a state in which the center axis of the screw part JEp21 (the center axis along the direction De2) is coincident with the rotation axis of the motor MOp2. Rotation of the motor MOp2 causes the screw part JEp21 to be rotated about its center axis (as a rotation axis) along the direction De2.

The connection part JEp23 includes a slider part JEp23*a* connected to the rail JEp24 to be movable relative to the rail JEp24 along the direction De2 and a support JEp23*b* supporting the nut JEp22 and the joint mechanism JEr3. For example, the nut JEp22 is fixed to the support JEp23*b* so as not to rotate together with the screw part JEp21. The support JEp23*b* is connected to the joint mechanism JEr3 so as to be rotated about the axis Ax3 (not shown in FIG. 2) in association with rotation of the motor MOr3. That is, the joint mechanism JEr3 rotates the support JEp23*b* about the axis Ax3 as a rotation axis in association with rotation of the motor MOr3.

It is also allowable that the slider part JEp23*a* and the support JEp23*b* not be strictly distinguished from each other. For example, the joint mechanism JEr3 may be connected to the slider part JEp23*a*. Furthermore, the nut JEp22 may be fixed to the slider part JEp23*a*. That is, the nut JEp22 may be connected to the connection part JEp23 or the like in such a manner that the position of the nut JEp22 relative to the joint mechanism JEr3 remains unchanged. Thus, the nut JEp22 is connected to the joint mechanism JEr3 via the connection part JEp23 or the like.

The rail JEp24 extends along the direction De2 and includes two rod-shaped members JEp24*a* and JEp24*b* disposed parallel to each other. The shape of each of the rod-shaped members JEp24*a* and JEp24*b* and the slider part JEp23*a* is not limited to any particular shape, as long as the slider part JEp23*a* is supported by the rod-shaped members JEp24*a* and JEp24*b*. The rail JEp24 is disposed between the opening Hlk2 and the screw part JEp21 in the direction along the axis Ax3 and is attached inside the link LK2. The rail JEp24 is not necessarily disposed between the opening Hlk2 and the screw part JEp21 in the direction along the axis Ax3, as long as the joint mechanism JEr3 is movable along the direction De2 with a portion of the joint mechanism JEr3 protruding from the opening Hlk2. In the present embodiment, it is envisaged that the straight line along the axis Ax3 and the straight line along the axis Ax2 are parallel to each other in plan view from the direction De1. For this reason, the "direction along the axis Ax3" may be understood as the "direction along the axis Ax2."

Since the nut JEp22 is fixed to the connection part JEp23 so as not to rotate together with the screw part JEp21, rotation of the screw part JEp21 causes the nut JEp22 to be moved relative to the screw part JEp21 along the direction De2. As described above, the nut JEp22 is fixed to the connection part JEp23 or the like in such a manner that the position of the nut JEp22 relative to the joint mechanism JEr3 remains unchanged. The joint mechanism JEr3 is supported by the joint mechanism JEp1 in such a manner that the position of the joint mechanism JEr3 relative to the link LK1 remains unchanged, while the screw part JEp11 is not rotated, that is, while the motor MOp1 is not rotated. A movement of the nut JEp22 relative to the screw part JEp21 causes the link LK2 to be moved along the direction De2 relative to the joint mechanism JEr3. Thus, the joint mechanism JEp2 supports the link LK2 so as to allow the link LK2 to be moved. The movable area ARmv2 (movable range) of the joint mechanism JEr3 is preferably set in such a manner that the joint mechanism JEr3 is movable between two areas, one of which is an area closer to the end LK2ed1 of the link LK2 than to the end LK2ed2, and the other is an area closer to the end LK2ed2 than to the end LK2ed1. This setting enables the substantial length (control length) of the link LK2 to be equal to or less than half of the length of the link LK2. Alternatively, it may be equal to or greater than half of the length of the link LK2. The substantial length of the link LK2 is, for example, the length along the direction De2 from the joint mechanism JEr3 (more accurately, the axis Ax3) to the end LK2ed2 (for example, the intersection of the link LK2 and the axis Ax4).

The joint mechanism JEr3 is supported by the joint mechanism JEp2 in such a manner that the position of the joint mechanism JEr3 relative to the link LK2 remains unchanged, while screw part JEp21 is not rotated, that is, while the motor MOp2 is not rotated. The joint mechanism JEr3 does not depend on the position relative to the link LK1 and turns the link LK2 relative to the link LK1. The joint mechanism JEr3 does not depend on the position relative to the link LK2 and turns the link LK2 relative to the link LK1 irrespective of.

Switching the rotational direction of the motor MOp2 causes the direction in which the nut JEp22 is moved relative to the screw part JEp21 (i.e., the direction in which the link LK2 moves) to be switched between the direction De2 and the direction opposite to the direction De2. For example, when the motor MOp2 is rotated in the first rotational direction, the link LK2 is moved in the opposite direction to the direction De2. When the motor MOp2 is rotated in the second rotational direction opposite to the first direction, the link LK2 is moved in the direction De2.

The configuration of the joint mechanisms JEp is not limited to the example shown in FIG. 2. For example, a ball screw including balls between the screw part JEp11 and the nut JEp12 may be employed as an element of the joint mechanism JEp1. Similarly, a ball screw including balls between the screw part JEp21 and the nut JEp22 may be employed as an element of the joint mechanism JEp2.

For example, a portion of the motor MOr3 may be located inside the link LK1. The remaining portion of the motor MOr3 may protrude from the opening Hlk1 and may be located outside the link LK1. The entire joint mechanism JEr3 may be located inside the link LK2. For example, the joint mechanism JEr3 may include an accommodating part that accommodates the motor MOr3. That is, the motor MOr3 may be provided in the joint mechanism JEr3. Alternatively, the motor MOr3 may be considered as one element of the joint mechanism JEr3. Similarly, the motor MOp1 may be considered as one element of the joint mechanism JEp1, and the motor MOp2 may be considered as one element of the joint mechanism JEp2.

Next, brief description will be given of the joint mechanisms JEr1, JEr2, JEr4, JEr5, and JEr6.

The joint mechanism JEr1 includes a rotating part JEr11 and a housing JEr12 that accommodates the rotating part JEr11. Rotation of the motor MOr1 that drives the joint mechanism JEr1 causes the rotating part JEr11 to be rotated about the axis Ax1 as a rotation axis. For example, the rotating part JEr11 is attached to the motor MOr1 to be rotatable relative to the base part BDPba about the axis Ax1 as a rotation axis. The housing JEr12 rotates, together with the rotating part JEr11, relative to the base part BDPba about the axis Ax1 as a rotation axis. For example, the housing JEr12 is connected to the base part BDPba to be rotatable relative to the base part BDPba about the axis Ax1 as a rotation axis. The housing JEr12 is further connected to the joint mechanism JEr2. Rotation of the rotating part JEr11 causes the joint mechanism JEr2 to be rotated relative to the base part BDPba about the axis Ax1. The motor MOr1 is an example of a "fourth motor."

The motor MOr1 may be considered to be one element of the joint mechanism JEr1. The housing JEr12 may be fixed to the base part BDPba. The joint mechanism JEr2 may be attached to the rotating part JEr11 to be rotatable relative to the housing JEr12 about the axis Ax1 as a rotation axis. In this case, the housing JEr12 may be considered as one element of the base part BDPba.

The joint mechanism JEr2 includes a rotating part JEr21 and a housing JEr22 that accommodates a motor MOr2 driving the joint mechanism JEr2. Rotation of the motor MOr2 causes the rotating part JEr21 to be rotated about the axis Ax2 as a rotation axis. For example, the rotating part JEr21 is attached to the motor MOr2 to be rotatable relative to the housing JEr22 about the axis Ax2 as a rotation axis. The rotating part JEr21 is further connected to the link LK1. The link LK1 is connected to the housing JEr22 to be rotatable relative to housing JEr22. Rotation of the rotating part JEr21 causes the link LK1 to be rotated relative to the housing JEr22 about the axis Ax2 as a rotation axis. The motor MOr2 is attached inside the housing JEr22. The motor MOr2 is an example of a "fifth motor."

The motor MOr2 may be considered to be one element of the joint mechanism JEr2. In the example shown in FIG. 2, a portion of the rotating part JEr21 is located inside the link LK1 and the remaining portion of the rotating part JEr21 is located inside the housing JEr22. However, the entire rotating part JEr21 may be located inside the link LK1 or inside the housing JEr22.

The joint mechanism JEr4 includes a rotating part JEr41 and a housing JEr42 that accommodates the rotating part JEr41. Rotation of a motor MOr4 that drives the joint mechanism JEr4 causes the rotating part JEr41 to be rotated about the axis Ax4 as a rotation axis. For example, the rotating part JEr41 is attached to the motor MOr4 to be rotatable relative to the link LK2 about the axis Ax4 as a rotation axis. The motor MOr4 is attached inside the link LK2.

The housing JEr42 rotates, together with the rotating part JEr41, relative to the link LK2 about the axis Ax4 as a rotation axis. For example, the housing JEr42 is connected to the link LK2 to be rotatable relative to the link LK2 about the axis Ax4 as a rotation axis. The housing JEr42 is further connected to the first portion TP11. Rotation of the rotating part JEr41 causes the first portion TP11 to be rotated, together with the housing part JEr42, about the axis Ax4 as a rotation axis.

The motor MOr4 may be considered to be one element of the joint mechanism JEr4. Although the entire rotating part JEr41 is located inside the housing JEr42 in the example shown in FIG. 2, the entire rotating part JEr41 may be located inside the link LK2. Alternatively, a portion of the rotating part JEr41 may be located inside the housing JEr42, and the remaining portion of the rotating part JEr41 may be located inside the link LK2.

The joint mechanism JEr5 includes a rotating part JEr51 and a housing JEr52 that accommodates a portion of the rotating part JEr51. Rotation of a motor MOr5 that drives the joint mechanism JEr5 causes the rotating part JEr51 to be rotated about the axis Ax5 as a rotation axis. For example, the rotating part JEr51 is attached to the motor MOr5 to be rotatable relative to the first portion TP11 about the axis Ax5 as a rotation axis. The motor MOr5 is attached inside the housing JEr42 of the joint mechanism JEr4.

The housing JEr52 rotates, together with the rotating part JEr51, relative to the first portion TP11 about the axis Ax5 as a rotation axis. For example, the housing JEr52 is connected to the first portion TP11 to be rotatable relative to the first portion TP11 about the axis Ax5 as a rotation axis. The housing JEr52 is further connected to the second portion TP12. Rotation of the rotating part JEr51 causes the second portion TP12 to be rotated, together with the housing JEr52, about the axis Ax5 as a rotation axis.

The motor MOr5 may be considered to be one element of the joint mechanism JEr5. Although a portion of the rotating part JEr51 is located inside the housing JEr52 and the remaining portion of the rotating part JEr51 is located inside the first portion TP11 in the example shown in FIG. 2, the entire rotating part JEr51 may be located inside the housing JEr52 or inside the first portion TP11.

The joint mechanism JEr6 includes a rotating part JEr61 and a housing JEr62 that accommodates a portion of the rotating part JEr61. Rotation of a motor MOr6 that drives the joint mechanism JEr6 causes the rotating part JEr61 to be rotated about the axis Ax6 as a rotation axis. For example, the rotating part JEr61 is attached to the motor MOr6 to be rotatable relative to the second portion TP12 about the axis Ax6 as a rotation axis. The housing JEr62 rotates, together with the rotating part JEr61, relative to the second portion TP12 about the axis Ax6 as a rotation axis. For example, the housing JEr62 is connected to the second portion TP12 to be rotatable relative to the second portion TP12 about the axis Ax6 as a rotation axis. The housing JEr62 includes the end surface TP1$sf$. Rotation of the rotating part JEr61 causes the end surface TP1$sf$ to be rotated relative to the second portion TP12 about the axis Ax6 as a rotation axis.

The motor MOr6 may be considered to be one element of the joint mechanism JEr6. The housing JEr62 may be fixed to the second portion TP12. The end effector 20 may be attached to a surface of the rotating part JEr61 to be rotatable relative to the housing JEr62. In this case, the surface of the rotating part JEr61 corresponds to the end surface TP1$sf$. When the housing JEr62 is fixed to the second portion TP12, the housing JEr62 may be considered to be one element of the second portion TP12.

The joint mechanisms JEr are not limited to the example shown in FIG. 2. Each joint mechanism JEr may have substantially the same configuration as the mechanism for a corresponding joint of a known articulated robot.

Next, description will be given of a state (posture) representing the characteristics of the robot 10 in the present embodiment. The links LK1 and LK2 of the robot 10 are transferred to more than one unique state including first, second, and third states described below. The state (posture) representing the characteristics of the robot 10 in the present embodiment is not limited to the first, second, and third states.

First State

First, the first state will be described with reference to FIG. 3.

Figure 3:
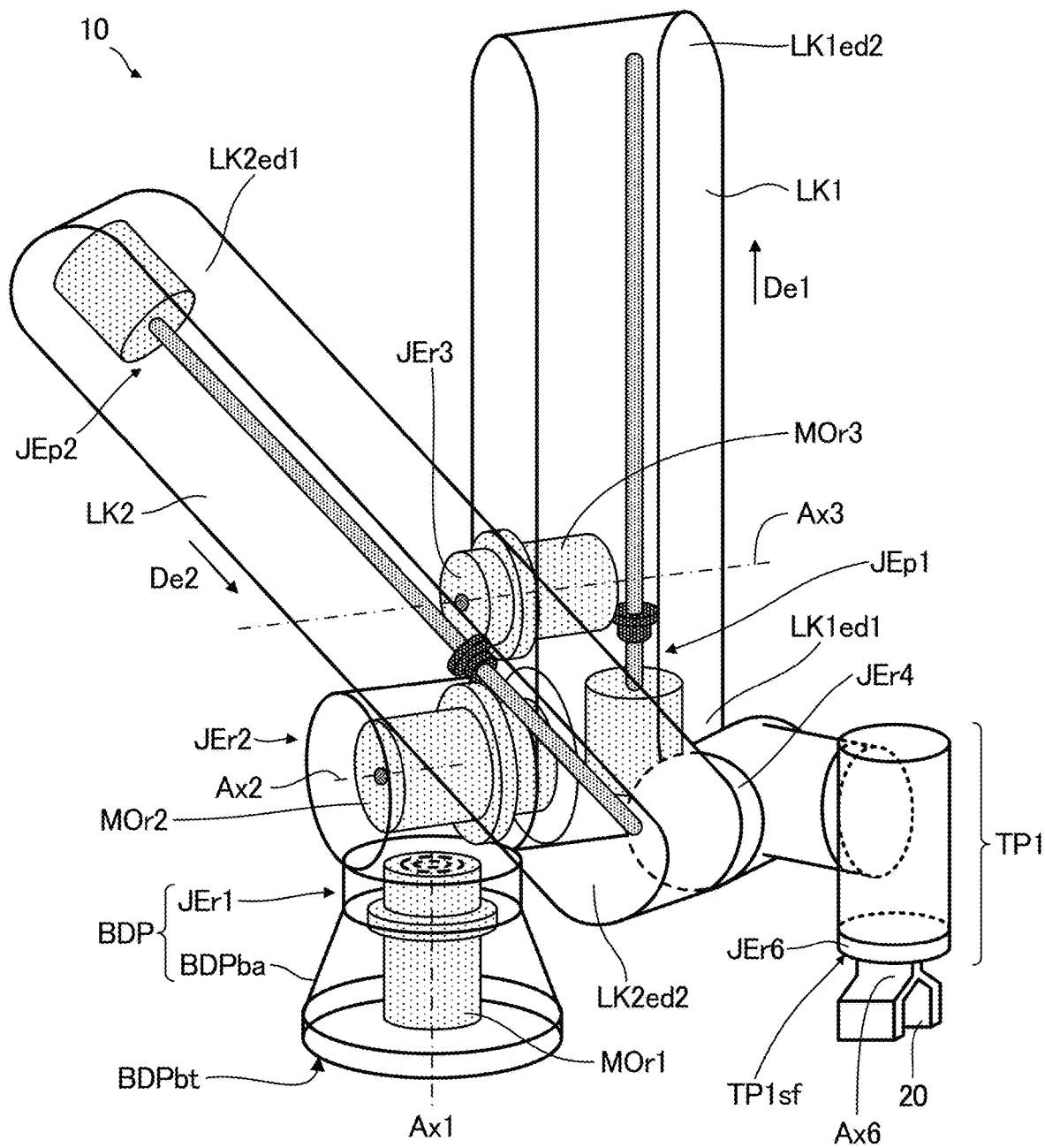
FIG. 3 is an explanatory diagram for explaining an example of a state of a robot shown in FIG. 1.

FIG. 3 is an explanatory diagram for an example of an overall form of the robot 10 shown in FIG. 1. The state of the links LK1 and LK2 shown in FIG. 3 refers to a first state. In FIG. 3, members identical to those shown in FIGS. 1 and 2 are denoted by the same reference signs. In FIG. 3, illustrations of some of elements not used for explanation of the first state (e.g., the rail JEp14) are omitted for clarity of illustration.

As shown in FIG. 3, the direction De1 is parallel to the axis Ax1. The axis Ax3 is located closer to the end LK1$ed$1 of the link LK1 than to the end LK1$ed$2. In addition, the axis Ax3 is located closer to the end LK2$ed$2 of the link LK2 than to the end LK2$ed$1. As a result, the length from the end LK1$ed$1 to the axis Ax3, which is the substantial link length (arm length) of the link LK1, is equal to or less than half of the length of the link LK1. Additionally, the length from the axis Ax3 to the end LK2$ed$2, which is the substantial link length (arm length) of the link LK2, is equal to or less than half of the length of the link LK2. The results lead to a reduction in an area in which the link LK1 and the link LK2 interfere with each other, and thereby the end section TP1 is easily moved to the vicinity of the base body BDP. Work in the vicinity of the base body BDP is achieved with ease.

Since the joint mechanisms JEr2, JEr3, and JEr4 do not come close to positions on one straight line in the first state, work in the vicinity of the base body BDP is achieved without worrying about singularity that causes loss of control of the posture of the robot 10. Thus, in the present embodiment, consideration of the singularity is no longer needed, and therefore, the robot 10 can safely move the end section TP1 to the vicinity of the base body BDP.

When the end section TP1 in the vicinity of the base body BDP is controlled using the joint mechanism JEr2 with the motor MOr2 and the joint mechanism JEr3 with the motor MOr3, control accuracy depends on the substantial lengths of the links LK1 and LK2. As the substantial lengths of the links LK1 and LK2 are shorter, control accuracy is greater, thereby improving vibration damping when the end section TP1 is stopped. The short substantial lengths of the links LK1 and LK2 in the first state according to the present embodiment improves the position accuracy and the vibration damping of the end section TP1.

The direction De1 is not necessarily parallel to the axis Ax1 in the first state. The link LK1 may be inclined to the axis Ax1 as long as the end section TP1 is located in the vicinity of the base body BDP.

Second State

As shown in FIG. 2, the second state refers to a state in which the following (i) and (ii) are met: (i) the directions De1 and De2 are parallel to the axis Ax1, and (ii) the end LK2$ed$1 of the link LK2 is located closer to the end LK1$ed$1 of the link LK1 than to the end LK1$ed$2. In this state, the axis Ax3 is located closer to the end LK1$ed$1 of the link LK1 than to the end LK1$ed$2. Additionally, the axis Ax3 is located closer to the end LK2$ed$1 of the link LK2 than to the end LK2$ed$2.

In the second state, the postures of the links LK1 and LK2 are maintained in such a manner that the links LK1 and LK2 extend along the axis Ax1. The result leads to a reduction in inertia force when the robot 10 is rotated about the axis Ax1 as a rotation axis, as compared with postures of the links LK1 and LK2 in which one or both thereof extend along a direction crossing the axis Ax1.

As a result, in the present embodiment, setting of the links LK1 and LK2 to the second state reduces inertia force caused by the physical lengths and weights of robot arms (the links LK1 and LK2). The result enables accurate control of the robot 10 in the present embodiment. For example, in the present embodiment, it is possible to reduce the effects of vibrations (vibration damping) when the operations of the robot 10 are stopped. The result leads to a reduction in the total time taken by a given task of the robot 10 and an improvement of its accurate operation.

In the second state, the position of the joint mechanism JEr3 (more exactly, the axis Ax3) is not limited to any particular position as long as the following (i) and (ii) are met: (i) the directions De1 and De2 are parallel to the axis Ax1, and (ii) the end LK2ed1 of the link LK2 is located closer to the end LK1ed1 of the link LK1 than to the end LK1ed2. For example, as shown in FIG. 2, the position of the joint mechanism JEr3 in the second state may meet the following (i) and (ii) are met: (i) the position is closer to the end LK1ed1 of the link LK1 than to the end LK1ed2, and (ii) the position is closer to the end LK1ed1 of the link LK2 than to the end LK1ed2. Alternatively, the position of the joint mechanism JEr3 in the second state may meet the following (i) and (ii) are met: (i) the position is closer to the end LK1ed2 of the link LK1 than to the end LK1ed1, and (ii) the position is closer to the end LK1ed2 of the link LK2 than to the end LK1ed1.

The state of the links LK1 and LK2 that reduces the inertia force when the robot 10 is rotated about the axis Ax1 as a rotation axis is not limited to the second state, as long as the links LK1 and LK2 have such postures that they extend along the axis Ax1. For example, the state of the links LK1 and LK2 may be a state close to the second state. In the state close to the second state, the directions De1 and De2 may be parallel to the axis Ax1, and the end LK2ed1 of the link LK2 may be located closer to the end LK1ed2 of the link LK1 than to the end LK1ed1. In this case, the link LK2 is located at a position at which the links LK1 and LK2 extend along the axis Ax1 and the end section TP1 is moved away from the link LK1. That is, in the present embodiment, setting of the links LK1 and LK2 to the second state or the state close to the second state reduces the inertia force when the robot 10 is rotated about the axis Ax1 as a rotation axis. However, the robot 10 is more stable when the end section TP1 is closer to the link LK1 than when the end section TP1 is far from the link LK1.

In the present embodiment, setting of the links LK1 and LK2 to the second state reduces the overall form of the robot 10, which helps a user when moving the robot 10 to another location easily. As a result, in the present embodiment, it is easy to install the robot 10 in a factory or change a place for installation of the robot 10 when replacing devices in the factory.

Third State

The reduced overall form of the robot 10 is not limited to the second state. Another example will be given of a reduced overall form of the robot 10 with reference to FIG. 4.

Figure 4:
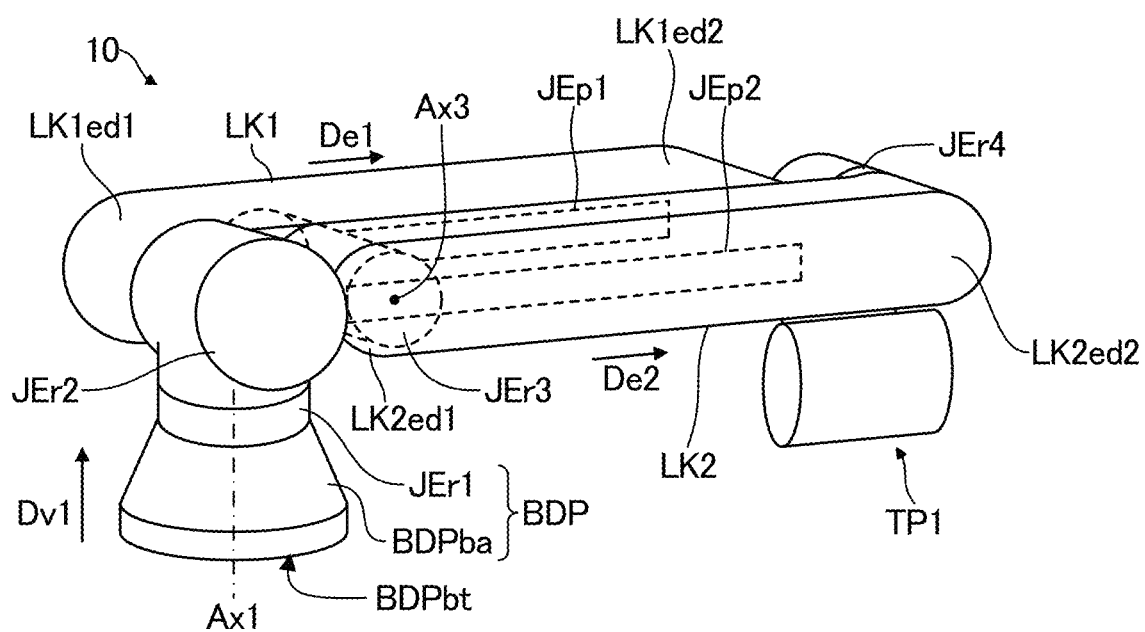
FIG. 4 is an explanatory diagram for another example of the state of the robot shown in FIG. 1.

FIG. 4 is an explanatory diagram for another example of an overall form of the robot 10 shown in FIG. 1. The state of the links LK1 and LK2 shown in FIG. 4 refers to a third state.

The third state refers to a state in which the following (i) and (ii) are met: (i) the directions De1 and De2 are perpendicular to the axis Ax1, and (ii) the end LK2ed1 of the link LK2 is located closer to the end LK1ed1 of the link LK1 than to the end LK1ed2. That is, in the third state, the postures of the links LK1 and LK2 are maintained in such a manner that the links LK1 and LK2 extend along a direction perpendicular to the axis Ax1 (a direction parallel to the bottom BDPbt of the base body BDP).

In the third state, as in the second state, the overall form of the robot 10 is reduced. When the links LK1 and LK2 are in the third state, it is easy to pack the robot 10 using padding or the like that has concave area for accommodating a portion of the end section TP1 and the base body BDP (portions protruding from the links LK1 and LK2 in the direction along the axis Ax1 along the axis Ax1).

Thus, in the present embodiment, setting of the links LK1 and LK2 to the third state reduces the overall form of the robot 10, which helps a user when moving the robot 10 to another location easily. In the third state, as in the second state, the position of the joint mechanism JEr3 (more exactly, the axis Ax3) is not limited to any particular position.

Typical Operations

Next, description will be given of advantageously typical operations of the robot 10 according to the present embodiment shown in FIG. 1 with reference to FIGS. 5 (a) and (b). However, the typical operations of the robot 10 are not limited to the following description.

Figure 5:
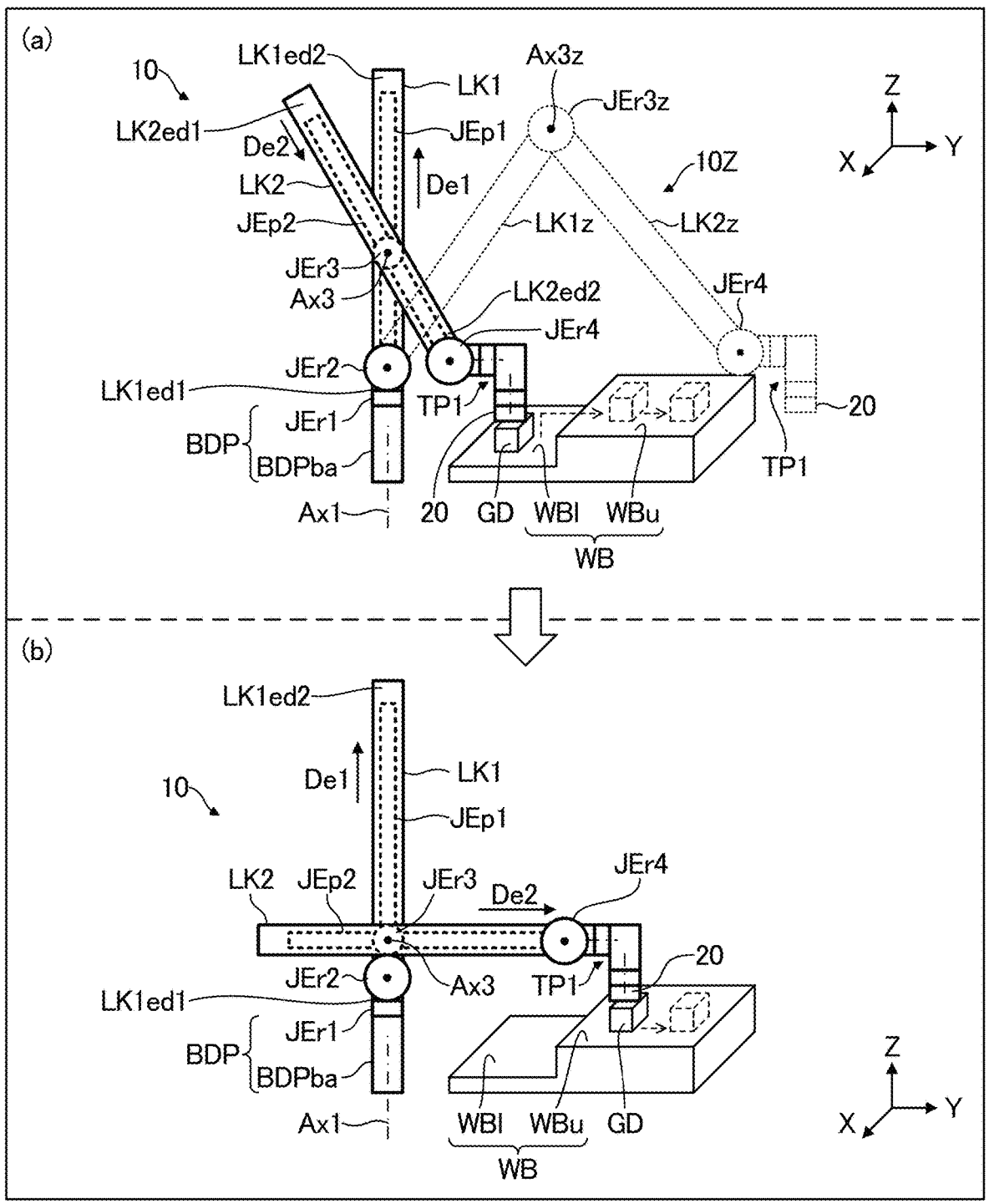
FIG. 5 is an explanatory diagram for advantageously typical operations of the robot shown in FIG. 1.

FIG. 5 is an explanatory diagram for advantageously typical operations of the robot 10 shown in FIG. 1. In FIG. 5, an example of the advantageously typical operations is given in which the robot 10 moves an object GD disposed on a lower shelf Wbl of a workbench WB to an upper shelf WBu thereof. For example, FIG. 5 (a) shows operations when the robot 10 performs a task for the object GD disposed on the lower shelf Wbl of the workbench WB. FIG. 5 (b) shows operations when the robot 10 performs a task for the object GD disposed on the upper shelf WBu thereof.

In FIGS. 5 (a) and (b), the orthogonal coordinate system including three axes (the X, Y, and Z-axes) that are orthogonal to one another is introduced for convenience. In the following description, the direction indicated with an X-axis arrow is called the +X-direction, and the direction opposite to the +X-direction is called the −X-direction. The direction indicated with a Y-axis arrow is called the +Y-direction, and the direction opposite to the +Y-direction is called the −Y-direction. The direction indicated with a Z-axis arrow is called the +Z-direction, and the direction opposite to the +Z-direction is called the −Z-direction. In the following description, the +Y-direction and the −Y-direction may be called the Y-direction without distinguishing one from the other, and the +X-direction and the −X-direction may be called the X-direction without distinguishing one from the other. The +Z-direction and the −Z-direction may be called the Z-direction without distinguishing one from the other. The −Z-direction side may be called a lower portion.

In FIGS. 5 (a) and (b), as described above, an advantage of the robot 10 will be explained when the object GD disposed on the lower shelf Wbl of the workbench WB Is moved to the upper shelf WBu thereof. For example, the workbench WB is disposed in the vicinity of the base body BDP of the robot 10. In FIG. 5 (a), it is envisaged that operations are from the first state (described with reference to FIG. 3) in which the end section TP1 is located in the vicinity of the base body BDP of the robot 10. First, a first comparative example will be given, in which a robot 10Z is compared with the robot 10. In FIG. 5 (a), the robot 10Z is illustrated shown with dotted lines for ease of understanding.

The robot 10Z is substantially the same as the robot 10. However, the joint mechanisms JEp1 and JEp2 are omitted from the robot 10. The robot 10Z has links LK1z and LK2z in place of the links LK1 and LK2, and has a joint mechanism JEr3z in place of the joint mechanism JEr3. The joint mechanism JEr3z connects one end of the link LK1z and one end of the link LK2z to each other. The joint mechanism JEr3z rotates the link LK2z relative to the link LK1z about an axis Ax3z as a rotation axis. The axis Ax3z is perpendicular to the direction in which the link LK1z extends. The position of the joint mechanism JEr3z relative to each of the links LK1z and LK2z remains unchanged. In the first comparative example, two positions of the center axes are coincident with each other in the direction along the axis Ax3z. One of the positions is a position of the center axis of the link LK1z, and the other is a position of the center axis of the link LK2z. In this case, the minimum angle formed by the link LK1z and the link LK2z may be limited to an angle of about 30°, because the links LK1z and LK2z interfere with each other. As a result, according to the robot 10Z, even when the angle formed by the links LK1z and LK2z is set to be small and the end section TP1 is attempted to move closer to the base body BDP, the links LK1z and LK2z interfere with each other, which causes an area in which the end section TP1 cannot be moved close to the base body BDP. The robot 10Z is unable to performs work (a desired task) for the object GD disposed on the workbench WB in the vicinity of the base body BDP.

In contrast, the robot 10 according to the present embodiment controls the joint mechanisms JEr2 and JEr3 and the joint mechanisms JEp1 and JEp2, which enables the robot 10 to move the end section TP1 close to the base body BDP as in the first state.

For example, the joint mechanism JEr2 turns the link LK1 and supports the link LK1 at such a position at which the axis Ax1 and the direction De1 in which the link LK1 extends are parallel to each other. The joint mechanism JEp1 moves the joint mechanism JEr3 along the direction De1 and supports the joint mechanism JEr3 at a position closer to the end LK1ed1 of the link LK1 than to the end LK1ed2. That is, the joint mechanism JEr3 is located in a lower part (on the −Z-direction side) in the link LK1. The joint mechanism JEp2 moves the link LK2 along the direction De2 and supports the link LK2 at a position at which it is possible to secure a movable space of the link LK2 and the end section TP1. For example, the joint mechanism JEp2 moves the link LK2 along the direction De2 in such a manner that the joint mechanism JEr3 is located closer to the end LK2ed2 of the link LK2 than to the end LK2ed1. The joint mechanism JEr3 then turns the link LK2 to arrange the end section TP1 in the vicinity of the base body BDP.

As a result, the end section TP1 is set to the first state and is moved to the vicinity of the base body BDP. For example, in the present embodiment, the joint mechanism JEr4 and the joint mechanisms JEr5 and JEr6 in the end section TP1 are controlled, which enables the robot 10 to perform a variety of tasks in the vicinity of the base body BDP.

In other words, in the first comparative example, there is an area in which the operations of the end section TP1 of the robot 10Z are prevented by the links LK1 and LK2. Even in such an area, the robot 10 according to the present embodiment controls one or both of the joint mechanisms JEp1 and JEp2, and thereby, the end section TP1 easily reaches the area. A working area is enlarged as well.

As a comparative example in which the end section TP1 is movable close to the base body BDP, another aspect (hereinafter, "second comparative example") is given in which two positions of the center axes are different from each other in the direction along the axis Ax3z. One of the positions is a position of the center axis of the link LK1z of the robot 10Z, and the other is a position of the center axis of the link LK2z thereof. The robot 10Z according to the second comparative example is configured in which the joint mechanism JEr3 of the robot 10 is fixed to the end LK1ed2 of the link LK1 and the end LK2ed1 of the link LK2. In the second comparative example, since the position of the center axis of the link LK1z and the position of the center axis of the link LK2z are offset from each other, interference between the link LK1z and the link LK2z is avoided.

However, in the second comparative example, control for moving the end section TP1 close to the base body BDP and control of the end section TP1 in the vicinity of the base body BDP are achieved by turning the entirety of links LK1z and LK2z. In contrast, the robot 10 according to the present embodiment has links LK1 and LK2 with short substantial link lengths, which improves the position accuracy and the vibration damping of the end section TP1.

In the second comparative example, when the end section TP1 is moved from a far position on the right side shown in FIG. 5 (a) in the −Y-direction to reach the vicinity of the base body BDP, such a position should be avoided due to the workbench WB that is an obstacle. For this reason, the joint mechanism JEr2 turns the link LK1z in such a manner that the joint mechanism JEr3z is moved away from the workbench WB in the −Y-direction. The joint mechanism JEr3z then turns the link LK2z to place the end section TP1 near the joint mechanism JEr2. Thereafter, the joint mechanisms JEr2 and JEr3z respectively turn the link LK1z and the link LK2z to place the end section TP1 near the base body BDP. This turning enables the end section TP1 to be moved to the vicinity of the base body BDP.

In the second comparative example, the workbench WB would also be an obstacle when the object GD disposed on the lower shelf WB1 of the workbench WB is moved to the upper shelf WBu of the workbench WB. It is necessary to avoid the workbench WB so as to prevent the end section TP1 from hitting the workbench WB. For this reason, the joint mechanism JEr2 turns the link LK1z in such a manner that the joint mechanism JEr3z is moved away from the workbench WB in the −Y-direction in a state in which the end effector 20 holds the object GD. The joint mechanism JEr3z then turns the link LK2z to move the end section TP1 away from the joint mechanism JEr2. Thereafter, the joint mechanisms JEr2 and JEr3z respectively turn the links LK1z and LK2z to put the object GD held by the end effector 20 on the upper shelf WBu of the workbench WB.

As described above, in the second comparative example, in order to move the end section TP1 to a reduced space in the vicinity of the base body BDP, or move the end section TP1 from the reduced space in the vicinity of the base body BDP, complicated control using many joint mechanisms JE is necessary, and numerous actions of the entire robot are also needed.

In contrast, in the robot 10 according to the present embodiment, the joint mechanism JEp2 moves the link LK2 relative to the joint mechanism JEr3, which decreases the length from the joint mechanism JEr3 to the end section TP1. As a result, in the following cases (i) and (ii), rotation at the link LK1 by the joint mechanism JEr2 is no longer necessary, and the end section TP1 and other parts can be moved using the joint mechanism JE on the end section side of the joint mechanism JEr3: (i) when the end section TP1 is moved from a far position on the right side shown in FIG. 5 (a) in the −Y-direction to reach the vicinity of the base body BDP, and (ii) when the object GD disposed on the lower shelf WB1 of the workbench WB is moved to the upper shelf WBu of the workbench WB. In particular, when the length from the joint mechanism JEr3 to the end section TP1 is short, the link LK and the end section TP1 can be moved within a reduced movable space, as compared with when the length from the joint mechanism JEr3 to the end section TP1 is long.

For example, as shown in FIG. 5 (b), with the end effector 20 holding the object GD, the joint mechanism JEr3 turns the link LK2 in such a manner that the direction De2 in which the link LK2 extends is perpendicular to the axis Ax1 (parallel to the plane of the upper shelf WBu of the workbench WB). The joint mechanism JEp2 then moves the link LK2 relative to the joint mechanism JEr3 in such a manner that the object GD held by the end effector 20 is overlapped on the upper shelf WBu of the workbench WB in plan view from the Z-direction. Plan view means to view objects from a particular direction, for example. The joint mechanism JEp1 moves the joint mechanism JEr3 along the direction De1 to put the object GD held by the end effector 20 on the upper shelf WBu of the workbench WB. As a result, the object GD disposed on the lower shelf Wbl of the workbench WB is moved to the upper shelf WBu thereof.

As described above, in the present embodiment, the robot 10 is easily driven even when the space in the vicinity of the robot 10 is limited. In the present embodiment, the result enables efficient operation of the robot 10 for the object GD disposed near the base body BDP.

In the present embodiment, when the object GD disposed on the upper shelf WBu of the workbench WB is further moved in the +Y-direction (i.e., is moved to the back) as shown in FIG. 5 (b), it is sufficient that the joint mechanism JEp2 moves the link LK2 relative to the joint mechanism JEr3. Thus, in the present embodiment, when the direction De2 in which the link LK2 extends is perpendicular to the Z-direction (the direction along the axis Ax1), it is possible to move the end section TP1 straight in the Y-direction by driving the joint mechanism JEp2 only. Consideration of the singularity is no longer necessary because only the joint mechanism JEp2 is driven. Thus, in the present embodiment, straight movement of the end section TP1 is achieved by simple control.

For example, back trajectory calculation is used to calculate the operation amount of each joint mechanism JE from the position of the end effector 20. In the back trajectory calculation, computational load tends to increase when the number of the joint mechanisms JE performing rotary actions is greater, as compared with when the number of the joint mechanisms JE performing rotary actions is less. In the present embodiment, when back trajectory calculation is performed in order to horizontally move the end effector 20 in the Y-direction, it is sufficient to calculate the amount of movement in the Y-direction (the direction De2). As a result, in the present embodiment, the computation load when back trajectory calculation for horizontally moving the end effector 20 in the Y-direction is reduced, so that high speed computation is performed.

The operations for moving the end section TP1 straight in the Y-direction may be performed in the third state described in FIG. 4. Also in this case, a straight movement of the end section TP1 in the Y-direction is achieved by simple control. For example, in the third state in which the joint mechanism JEr3 is located at the end LK1ed1 of the link LK1 (the third state shown in FIG. 4), a straight movement of the end section TP1 in the Y-direction is achieved by driving the joint mechanism JRp1 only. Furthermore, in the third state in which the joint mechanism JEr3 is located at the end LK1ed2 of the link LK1, a straight movement of the end section TP1 in the Y-direction is achieved by driving the joint mechanism JRp2 only. In the third state, the end section TP1 may be moved straight in the Y-direction by driving both the joint mechanisms JRp1 and JEp2. For example, in the third state, the end section TP1 may be moved straight in the Y-direction by driving both the joint mechanisms JRp1 and JEp2 in such a manner that the joint mechanism JEr3 is located near the middle between the end LK1ed1 of the link LK1 and the end LK2ed2 of the link LK2.

Even when the end section TP1 is moved straight in the Y-direction in the third state, consideration of the singularity is not needed, and therefore safe operation of the robot 10 is achieved. The operations of moving the TP1 straight in the Z-direction are performed by simple control, for example, by placing the links LK1 and LK2 in the second state shown in FIG. 2.

Next, a hardware configuration of the robot controller 30 will be described with reference to FIG. 6.

Figure 6:
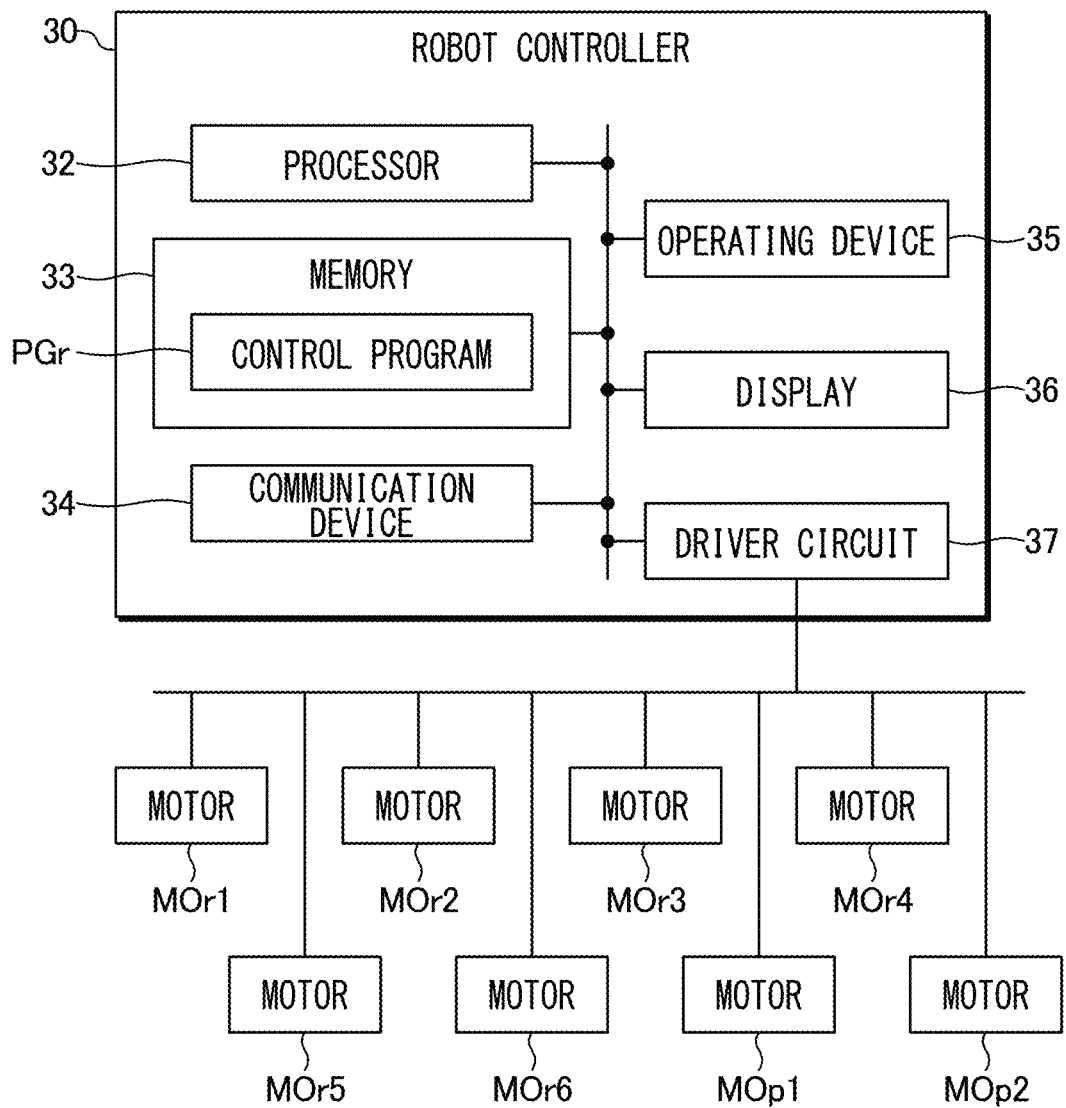
FIG. 6 is a diagram illustrating an example of a hardware configuration of a robot controller shown in FIG. 1.

FIG. 6 is a diagram illustrating an example of the hardware configuration of the robot controller 30 shown in FIG. 1.

The robot controller 30 includes a processor 32 that controls each part of the robot controller 30, a memory 33 that stores therein a variety of types of information, a communication device 34, an operating device 35 that receives input operations from a human operator, a display 36, and a driver circuit 37.

The memory 33 includes one or both of a volatile memory, such as a RAM (Random Access Memory) that functions as a working area of the processor 32, and a nonvolatile memory, such as an EEPROM (Electrically Erasable Programmable Read-Only Memory) that stores therein a variety of information, such as a control program PGr. The memory 33 may be attachable to and detachable from the robot controller 30. Specifically, the memory 33 may be a storage medium, such as a memory card to be attached to and detached from the robot controller 30. The memory 33 may also be a storage device (for example, an online storage) communicably connected to the robot controller 30 via a network or the like, for example.

The memory 33 shown in FIG. 6 stores therein the control program PGr. In the present embodiment, the control program PGr includes an application program for the robot controller 30 to control operations of the robot 10, for example. However, the control program PGr may include an operating robot system program for the processor 32 to control each part of the robot controller 30, for example.

The processor 32 is a processor that controls the entire robot controller 30 and is configured to include one CPU (Central Processing Unit) or a plurality of CPUs, for example. The processor 32 controls operations of the robot 10 by, for example, executing the control program PGr stored in the memory 33 and operating in accordance with the control program PGr. The control program PGr may be transmitted from another device via a network or the like.

For example, when the processor 32 is configured to include CPUs, one, some, or all of functions of the processor 32 may be implemented by the CPUs operating cooperatively in accordance with a program, such as the control program PGr. The processor 32 may be configured to include hardware, such as a GPU (Graphics Processing Unit), a DSP (Digital Signal Processor), or an FPGA (Field Programmable Gate Array) in addition to one or more CPUs, or instead of one, some, or all of one or more CPUs. In this case, one, some, or all of the functions of the processor 32 may be implemented by hardware, such as a DSP.

The communication device 34 is hardware for performing communication with an external device present outside the robot controller 30. For example, the communication device 34 has a function of communicating with the external device by near field communication. The communication device 34 may further have a function of communicating with the external device via a mobile communication network or another network.

The operating device 35 is an input device (e.g., a keyboard, a mouse, a switch, a button, and a sensor) that receives user inputs. For example, the operating device 35 receives operations input by a human operator and outputs operation information in accordance with the operations to the processor 32. For example, a touch panel that detects touch inputs on the display surface of the display 36 may be employed as the operating device 35.

The display 36 is an output device that outputs data. The display 36 displays an image, for example, under control by the processor 32. The operating device 35 and the display 36 may be configured as one unit (e.g., a touch panel).

The driver circuit 37 is hardware that outputs a signal for driving the robot 10 to the robot 10 under control by the processor 32. For example, the driver circuit 37 outputs signals for driving the motors MOr1, MOr2, MOr3, MOr4, MOr5, MOr6, MOp1, and MOp2 to the robot 10 under control by the processor 32. The motors MOr1, MOr2, MOr3, MOr4, MOr5, and MOr6 are motors driving the joint mechanisms JEr1, JEr2, JEr3, JEr4, JEr5, and JEr6, respectively. The motors MOp1 and MOp2 are motors driving the joint mechanisms JEp1 and JEp2, respectively.

Thus, the robot controller 30 controls operations of the robot 10 by controlling the motors MOr1, MOr2, MOr3, MOr4, MOr5, MOr6, MOp1, and MOp2.

In the foregoing embodiment, the robot 10 includes the base body BDP, the end section TP1, the links LK1 and LK2 (the links LK) that connect the base body BDP and the end section TP1 to each other, the joint mechanism JEr3, the joint mechanism JEp1, and the joint mechanism JEp2. The joint mechanism JEr3 connects the link LK1 and the link LK2 to each other. The joint mechanism JEr3 rotates the link LK2 relative to the link LK1 about the axis Ax3 as a first rotation axis. The axis Ax3 forms an angle greater than a predetermined angle with the direction De1 in which the link LK1 extends. The joint mechanism JEp1 moves the joint mechanism JEr3 relative to the link LK1 along the direction De1. The joint mechanism JEp2 moves the link LK2 relative to the joint mechanism JEr3 along the direction De2 in which the link LK2 extends.

Thus, in the present embodiment, the joint mechanism JEp1 moves the joint mechanism JEr3 along the direction De1 relative to the link LK1. The joint mechanism JEp2 moves the link LK2 along the direction De2 relative to the joint mechanism JEr3. Accordingly, in the present embodiment, a movement of the end section TP1 of the robot 10 to the vicinity of the base body BDP is achieved by simple control.

In the present embodiment, the robot 10 further includes the joint mechanisms JEr1, JEr2, and JEr3. The joint mechanism JEr1 rotates at least a portion of the base body BDP about the axis Ax1 as a second rotation axis. The axis Ax1 forms an angle equal to or less than the predetermined angle with a direction perpendicular to the bottom BDPbt of the base body BDP. The joint mechanism JEr2 connects the base body BDP and the link LK1 to each other. The joint mechanism JEr2 rotates the link LK1 about the axis Ax2 as a third rotation axis. The axis Ax2 forms an angle greater than the predetermined angle with the direction perpendicular to the bottom BDPbt of the base body BDP. The joint mechanism JEr4 connects the link LK2 and the end section TP1 to each other and rotates the end section TP1 relative to the link LK2. Accordingly, in the present embodiment, it is possible to move the end section TP1 connected to the link LK2 to the vicinity of the base body BDP connected to the link LK1 by simple control.

In the present embodiment, the joint mechanism JEr4 rotates the end section TP1 relative to the link LK2 about the axis Ax4 as a fourth rotation axis. The axis Ax4 forms an angle greater than the predetermined angle with the direction De2. The end section TP1 includes the first portion TP11 connected to the link LK2, the second portion TP12 connected to the first portion TP11, the joint mechanism JEr5, and the joint mechanism JEr6. The joint mechanism JEr5 connects the first portion TP11 and the second portion TP12 to each other. The joint mechanism JEr5 rotates the second portion TP12 relative to the first portion TP11 about the axis Ax5 as a fifth rotation axis. The axis Ax5 forms an angle greater than the predetermined angle with the fourth rotation axis (the axis Ax4). The joint mechanism JEr6 rotates a portion (e.g., the end surface TP1sf) of the end section TP1, to which the end effector 20 is attached, about the axis Ax6 as a sixth rotation axis. The axis Ax6 forms an angle greater than the predetermined angle with the fifth rotation axis (the axis Ax5). Thus, in the present embodiment, the joint mechanisms JEp1 and JEp2 may be added to a vertical 6-axis articulated robot. For example, in the present embodiment, the end section TP1 includes the joint mechanisms JEr5 and JEr6, which enables the robot 10 to perform a variety of tasks in the vicinity of the base body BDP by the joint mechanisms JEr4, JEr5, and JEr6, and the like.

In the present embodiment, the links LK1 and LK2 are transferred to the first state. The first state refers to a state in which the following (i) and (ii) are met:
  (i) the first rotation axis (the axis Ax3) is located closer to the end LK1ed1, where the end LK1ed1 is one end of the two ends LK1ed of the link LK1 and is closer to the base body BDP than to the end LK1ed2 that is farther from the base body BDP, and
  (ii) the first rotation axis is located closer to the end LK1ed2, where the end LK1ed2 is one end of the two ends LK2ed of the link LK2 and is closer to the end section TP1 than to the other end LK2ed1 that is farther from the end section TP1.

As described above, in the first state, the axis Ax3 is located near the base body BDP. As a result, in the first state, it is possible to decrease the length from the axis Ax3 to the end section TP1 when the end section TP1 is located in the vicinity of the base body BDP. For example, when the length from the axis Ax3 to the end section TP1 is short, a movable space of the link LK2 and the end section TP1 is not necessarily needed, as compared with when the length from the axis Ax3 to the end section TP1 is long. For this reason, in the present embodiment, an easily driven robot 10 is achieved even when the spaces in the vicinity of the robot 10 is reduced. This enables efficient working of the robot 10 for the object GD disposed in a place near the base body BDP.

In the present embodiment, the links LK1 and LK2 are transferred to the second state. The second state refers to a state in which the following (i) and (ii) are met:
  (i) the directions De1 and De2 are parallel to the second rotation axis (the axis Ax1), and (ii) the end LK2ed1 of the two ends LK2ed of the link LK2 that is farther from the end part TP1 is located closer to the end LK1ed1 of the two ends LK1ed of the link LK1, where the end LK1ed1 is an end closer to the base body BDP than to the end LK1ed2 of the two ends of the link LK1ed that is farther from the base body BDP.

Since the links LK1 and LK2 extend along the axis Ax1 in the second state, it is possible to reduce inertia; force when the robot 10 is rotated about the axis Ax1 as a rotation axis. In the present embodiment, setting of the links LK1 and LK2 to the second state reduces inertial force caused by the physical lengths and weights of robot arms (the links LK1 and LK2). The result leads to a reduction in the total time taken by tasks of the robot 10 including rotations of the robot 10 about the axis Ax1 as a rotation axis and an improvement in its accurate operation.

In the present embodiment, the robot 10 further includes the motor MOr3 driving the joint mechanism JEr3, the motor MOp1 driving the joint mechanism JEp1, and the motor MOp2 driving the joint mechanism JEp2. The joint mechanism JEp1 includes the screw part JEp11 and the nut JEp12. The screw part JEp11 is disposed within the link LK1 and extends in the direction De1. Rotation of the motor MOp1 causes the screw part JEp11 to be rotated about an axis (rotation axis) along the direction De1. The nut JEp12 is connected to the joint mechanism JEr3, and the screw part JEp11 is inserted to the nut JEp12. The nut JEp12 is moved relative to the screw part JEp11 in association with rotation of the screw part JEp11. The joint mechanism JEp2 includes the screw part JEp21 and the nut JEp22. The screw part JEp21 is disposed within the link LK2 and extends in the direction De2. Rotation of the motor MOp2 causes the screw part JEp21 to be rotated about an axis (rotation axis) along the direction De2. The nut JEp22 is connected to the joint mechanism JEr3, and the screw part JEp21 is inserted into the nut JEp22. The nut JEp22 is moved relative to the screw part JEp21 by rotation of the screw part JEp21. A movement of the nut JEp12 causes the joint mechanism JEr3 to be moved relative to the link LK1. A movement of the nut JEp22 causes the link LK2 to be moved relative to the joint mechanism JEr3. Thus, in the present embodiment, simple configurations of the joint mechanisms JEp1 and JEp2 are achieved.

In the present embodiment, the robot controller 30 controls operations of the robot 10 by controlling the motors MOr3, MOp1, and MOp2. Thus, in the present embodiment, an easy control of the robot 10 is achieved by the robot controller 30.

In the present embodiment, the robot system 1 includes the robot 10, the end effector 20 attached to the end section TP1, and the robot controller 30 controlling operations of the robot 10 and the end effector 20. As described above, in the present embodiment, the robot 10, which moves the end section TP1 to the vicinity of the base body BDP by simple control, is used in the robot system 1. In this embodiment, complicated tasks as well as simple tasks are achieved efficiently, even in a narrow place in the vicinity of the base body BDP. For example, the robot system 1 may be used in a method for manufacturing an object, and the method may include assembling or removing components. In this case, a task for assembling or removing components is achieved efficiently.

2. Second Embodiment

Next, with reference to FIG. 7, description will be given of an example of the outline of the robot system 1 according to a second embodiment.

Figure 7:
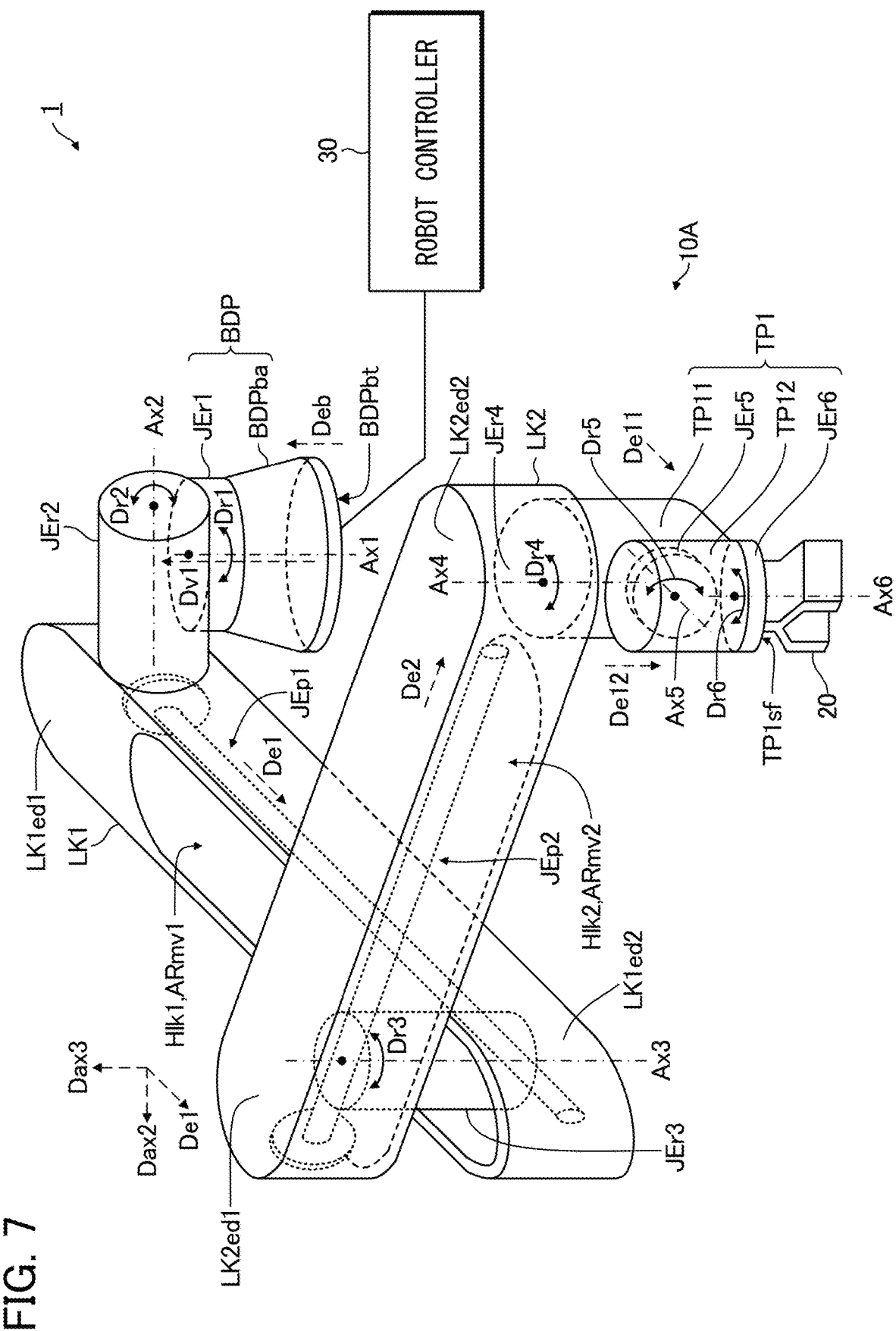
FIG. 7 is an explanatory diagram for an outline of a robot system according to a second embodiment.

FIG. 7 is an explanatory diagram for an outline of the robot system 1 according to the second embodiment. Elements substantially the same as those described in FIGS. 1 to 6 are denoted by like reference signs and detailed explanations thereof are omitted.

The robot system 1 shown in FIG. 7 is substantially the same as the robot system 1 shown in FIG. 1. However, the robot system 1 includes a robot 10A in place of the robot 10 shown in FIG. 1. For example, the robot system 1 shown in FIG. 7 includes the robot 10A, the end effector 20 attached to the robot 10A to be detachable, and the robot controller 30 controlling operations of the robot 10A and the end effector 20. The robot 10A is another example of an "articulated robot." In FIG. 7, the motors MO driving the joint mechanisms JE and a reducer and an encoder provided for each motor MO are not illustrated for clarity of illustration.

The robot 10A is substantially the same as the robot 10 shown in FIG. 1. However, the straight line along the axis Ax3 and the straight line along the axis Ax2 are perpendicular to each other in plan view from the direction De1. For example, in the robot 10 shown in FIG. 1, the joint mechanism JEr2 and the link LK1 are connected to each other in such a manner that a straight line along the axis Ax3 and a straight line along the axis Ax2 are parallel to each other in plan view from the direction De1. In contrast, in the robot 10A, the joint mechanism JEr2 and the link LK1 are connected to each other in such a manner that a straight line along the axis Ax3 and a straight line along the axis Ax2 are perpendicular to each other in plan view from the direction De1. In the following description, the joint mechanisms JEr2 and JEr3 are mainly described.

The joint mechanism JEr2 connects the base body BDP and the link LK1 to each other. The joint mechanism JEr2 rotates the link LK1 relative to the base body BDP about the axis Ax2 as a rotation axis. The axis Ax2 is parallel to the bottom BDPbt of the base body BDP. A rotational direction Dr2 shown in FIG. 7 indicates the rotational direction of the link LK1 when the link LK1 is rotated about the axis Ax2 as a rotation axis. A direction Dax2 refers to a direction from the joint mechanism JEr2 to the link LK1 and is one of the two directions along the axis Ax2 of the joint mechanism JEr2.

In the present embodiment, by the joint mechanism JEr1, the link LK1 is rotated relative to the base body BDP about the axis Ax1 as a rotation axis. Furthermore, by the joint mechanism JEr2, the link LK1 is rotated relative to the base body BDP about the axis Ax2 as a rotation axis.

The joint mechanism JEr3 connects the link LK1 and the link LK2 to each other. The joint mechanism JEr3 rotates the link LK2 relative to the link LK1 about the axis Ax3 as a rotation axis. The axis Ax3 is perpendicular to the direction De1 in which the link LK1 extends. The rotational direction Dr3 shown in FIG. 7 indicates the rotational direction of the link LK2 when the link LK2 is rotated about the axis Ax3 as a rotation axis. A direction Dax3 refers to a direction from the link LK1 to the link LK2 and is one of the two directions along the axis Ax3 of the joint mechanism JEr3.

In the present embodiment, the axis Ax3 is an axis perpendicular to the directions De1 and Dax2. In this case, as described above, the straight line along the axis Ax3 and the straight line along the axis Ax2 cross at 90 degrees in plan view from the direction De1. That is, the direction Dax3 along the axis Ax3 and the direction Dax2 along the axis Ax2 cross at 90 degrees in plan view from the direction De1. The phrase "cross at 90 degrees" includes not only crossing at exactly 90 degrees but also crossing at substantially 90 degrees (for example, an angle within an error range which can be regarded as 90 degrees). The "90 degrees" is an example of a "first angle."

Thus, in the present embodiment, since the direction Dax3 along the axis Ax3 and the direction Dax2 along the axis Ax2 cross at 90 degrees in plan view from the direction De1, the turning surface of the link LK2 is perpendicular to the turning surface of the link LK1. The turning surface of the link LK2 is a surface containing the trajectory of a predetermined position of the link LK2 when the link LK2 is rotated about the axis Ax3 as a rotation axis. Similarly, the turning surface of the link LK1 is a surface containing the trajectory of a predetermined position of the link LK1 when the link LK1 is rotated about the axis Ax2 as a rotation axis.

The state (posture) of the robot 10A shown in FIG. 7 is one of the states representing the characteristics of the robot 10A in the present embodiment. For example, in the posture shown in FIG. 7, the link LK1 is lowered by the joint mechanism JEr2 until the link LK1 is horizontal to the bottom BDPbt of the base body BDP, that is, horizontal to the ground plane of the robot 10A. The joint mechanism JEr3 is located at a position closer to the end LK1ed2 of the link LK1 than to an intermediate area ARmd1 (see FIG. 8). The intermediate area ARmd1 is an area of the movable area ARmv1 which excludes both ends of the movable area ARmv1. The joint mechanism JEr3 is also located at a position closer to the end LK2ed2 of the link LK2 than to an intermediate area ARmd2 (see FIG. 8). The intermediate area ARmd2 is an area of the movable area ARmv2 which excludes both ends of the movable area ARmv2.

In the present embodiment, the joint mechanism JEr3 rotates (turns) the link LK2 relative to the link LK1 from the posture shown in FIG. 7, which causes the end section TP1 to be rotated in the horizontal direction relative to the ground plane. Furthermore, in the present embodiment, the joint mechanism JEp1 moves the joint mechanism JEr3 along the direction De1 from the posture shown in FIG. 7, which causes the end section TP1 to be moved along the direction De1. Furthermore, in the present embodiment, the joint mechanism JEp2 moves the joint mechanism JEr3 along the direction De2 from the posture shown in FIG. 7, which causes the end section TP1 to be moved along the direction De2. That is, in the present embodiment, the end section TP1 can be moved in the horizontal direction relative to the ground plane from the posture shown in FIG. 7. A specific example of the operations of moving the end section TP1 in the horizontal direction relative to the ground plane is described with reference to FIGS. 9 and 10 described later.

In the present embodiment, the joint mechanism JEp1 enables the link LK2 to be moved along the direction De1 relative to the link LK1, and the joint mechanism JEp2 enables the link LK2 to be moved along the direction De2 relative to the link LK1. As a result, in the present embodiment, a reachable area of the end section TP1 (more specifically, the end surface TP1sf) is enlarged, which also enlarges a reachable range of the end effector 20 attached to the robot 10A.

In the present embodiment, the joint mechanisms JEp1 and JEp2 enable the end section TP1 of the robot 10A to be easily moved to the vicinity of the base body BDP. For example, the robot controller 30 controls the joint mechanisms JEp1 and JEp2 in such a manner that the axis Ax3 is located closer to the end LK1ed1 of the link LK1 than to the end LK1ed2 and is located closer to the end LK2ed2 of the link LK2 than to the end LK2ed1. In this case, the length from the end LK1ed1 to the axis Ax3, which is the substantial link length (arm length) of the link LK1, is equal to or less than half of the length of the link LK1. The length from the axis Ax3 to the end LK2ed2, which is the substantial link length (arm length) of the link LK2, is equal to or less than half of the length of the link LK2. As a result, an area in which the link LK1 and the link LK2 interfere with each other is very small, which enables the end section TP1 to be easily moved to the vicinity of the base body BDP. An easy task of the robot 10A in the vicinity of the base body BDP is thereby achieved.

In the present embodiment, decreasing the substantial link lengths of the links LK1 and LK2 enables control of the end section of an articulated robot with high accuracy without reducing the working area of the articulated robot even in the vicinity of the base.

The configuration of the robot system 1 is not limited to the example shown in FIG. 7. For example, in plan view from the direction De1, the angle at which the direction Dax3 along the axis Ax3 and the direction Dax2 along the axis Ax2 cross each other is not limited to 90 degrees. For example, in plan view from the direction De1, the direction Dax3 along the axis Ax3 and the direction Dax2 along the axis Ax2 may cross each other at the first angle equal to or greater than a predetermined angle.

Next, brief description will be given of an example of the joint mechanism JEr2 with reference to FIG. 8.

Figure 8:
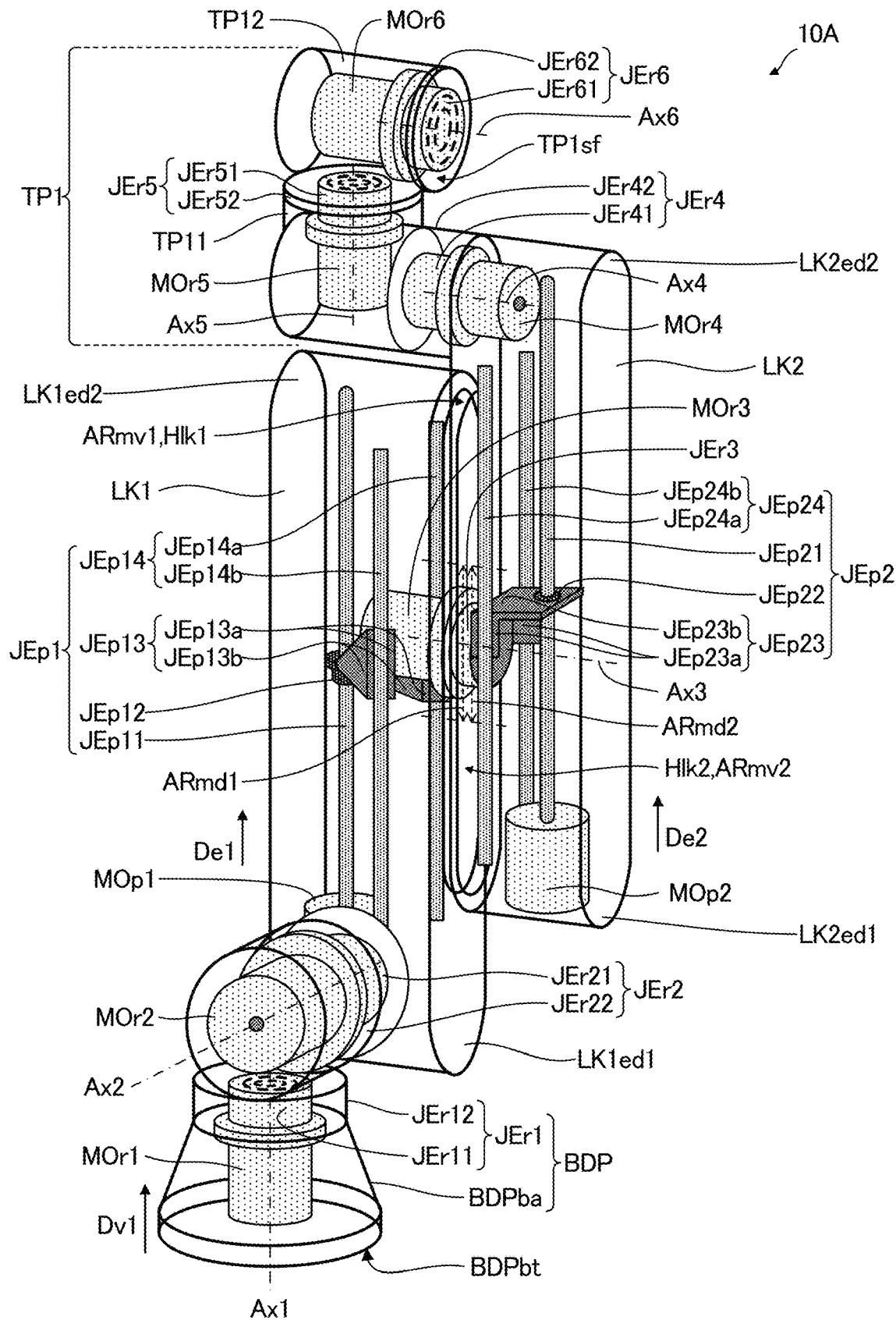
FIG. 8 is an explanatory diagram for an example of joint mechanisms.

FIG. 8 is an explanatory diagram for an example of the joint mechanisms JE. Each joint mechanism JE is substantially the same as the corresponding joint mechanism JE shown in FIG. 2. However, the joint mechanism JEr2 and the link LK1 are connected to each other in such a manner that a straight line along the axis Ax3 and a straight line along the axis Ax2 are perpendicular to each other in plan view from the direction De1. In FIG. 8, description will primarily be given of the joint mechanism JEr2.

In the present embodiment, the joint mechanism JEr2 includes the rotating part JEr21 and the housing JEr22 that accommodates the motor MOr2 driving the joint mechanism JEr2, for example. The rotating part JEr21 rotates about the axis Ax2 as a rotation axis in association with rotation of the motor MOr2. For example, the rotating part JEr21 is attached to the motor MOr2 to be rotatable relative to the housing JEr22 about the axis Ax2 as a rotation axis. The rotating part JEr21 is further connected to the link LK1. The link LK1 is connected to the housing JEr22 to be rotatable relative to the housing JEr22. As a result, rotation of the rotating part JEr21 causes the link LK1 to be rotated about the axis Ax2 relative to the housing JEr22. The motor MOr2 is attached inside the housing JEr22.

The rotating part JEr21 is located outside the link LK1 in the example shown in FIG. 8. However, a portion of the rotating part JEr21 may be located inside the link LK1, and the remaining portion of the rotating part JEr21 may be located inside the housing JEr22. Alternatively, the entire rotating part JEr21 may be located inside the link LK1 or inside the housing JEr22.

FIG. 8 shows an example of the joint mechanism JEr3 as follows: The joint mechanism JEr3 is located in the intermediate area ARmd1 of the movable area ARmv1 excluding both ends thereof. Additionally, the joint mechanism JEr3 is located in the intermediate area ARmd2 of the movable area ARmv2 excluding both ends thereof. However, the position of the joint mechanism JEr3 is not limited to any particular position. For example, in the posture shown in FIG. 8, the position of the joint mechanism JEr3 may meet the following (i) and (ii): the position is closer to the end LK1ed1 of the link LK1 than to the end LK1ed2, and (ii) the position is closer to the end LK1ed1 of the link LK2 than to the end LK1ed2. Alternatively, in the posture shown in FIG. 8, the position of the joint mechanism JEr3 may meet the following (i) and (ii): (i) the position is closer to the end LK1ed2 of the link LK1 than to the end LK1ed1, and (ii) the position is closer to the end LK1ed2 of the link LK2 than to the end LK1ed1.

Next, with reference to FIGS. 9 and 10, description will be given of an example of an operation in which the end section TP1 is moved in the horizontal direction relative to a ground plane.

Figure 9:
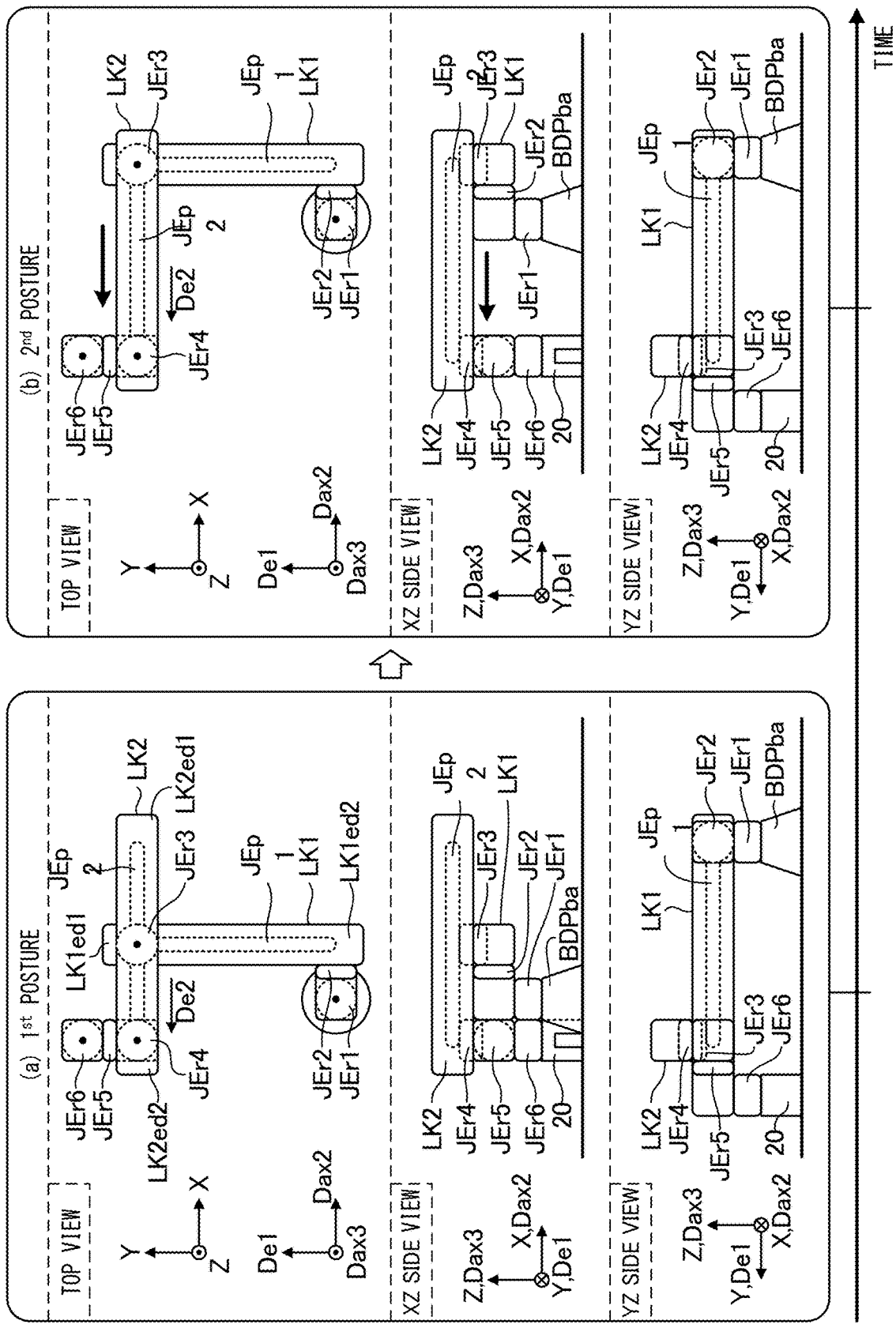
FIG. 9 is an explanatory diagram for an example of an operation in which an end section of a robot is moved relative to the ground plane in the horizontal direction.

FIG. 9 is an explanatory diagram for an example of an operation in which the end section TP1 of the robot 10A is moved in the horizontal direction relative to the ground plane. FIG. 10 is an explanatory diagram for operations following to the operations of the robot 10A shown in FIG. 9.

Figure 10:
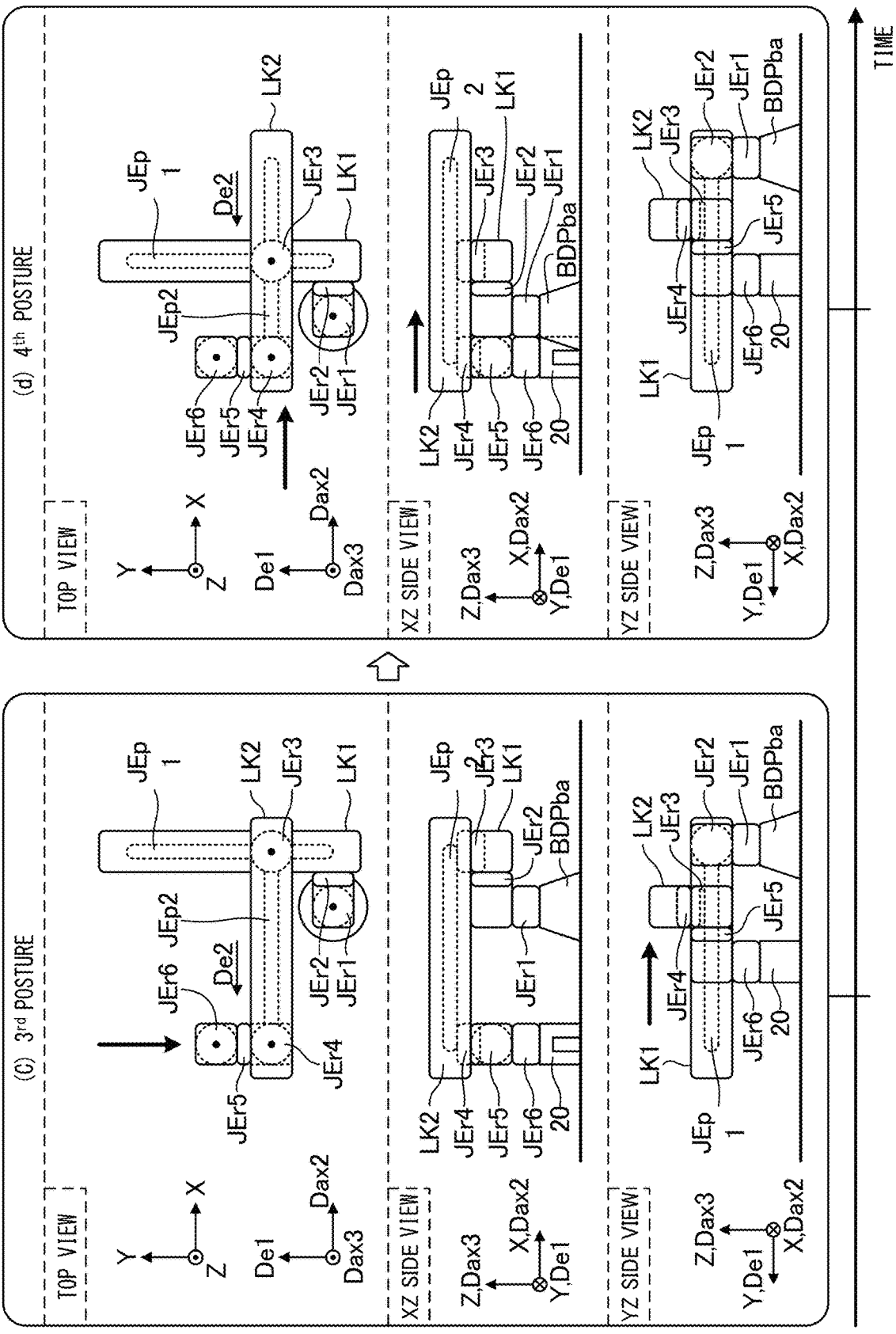
FIG. 10 is an explanatory diagram for operations following operations of the robot shown in FIG. 9.

In FIGS. 9 and 10 in addition to FIG. 11 (described later), the orthogonal coordinate system including three axes (the X-, Y-, and Z-axes) that are orthogonal to one another is introduced for convenience.

In the present embodiment, it is envisaged that the XY plane is parallel to the bottom BDPbt of the base body BDP, that is, parallel to the ground plane of the robot 10A. In the example shown in FIGS. 9 and 10, the direction De1 is parallel to the Y-direction, the direction Dax2 is parallel to the X-direction, and the direction Dax3 is parallel to the Z-direction.

The top view schematically illustrates the state of the robot 10A viewed from the +Z-direction. The XZ side view schematically illustrates the state of the robot 10A viewed from the −Y-direction. The YZ side view schematically illustrates the state of the robot 10A viewed from the −X-direction.

In the first posture shown in FIG. 9 (a), the link LK1 is lowered by the joint mechanism JEr2 until it is horizontal to the bottom BDPbt of the base body BDP, that is, horizontal to the ground plane of the robot 10A. The link LK2 is maintained by the joint mechanism JEr3 in a state in which two directions are perpendicular to each other in plan view viewed from the +Z-direction, in which one direction is a direction in which the link LK2 extends (the direction De2), and the other is a direction in which the link LK1 extends (the direction De1). The joint mechanism JEr3 is located at a position closer to the end LK1ed1 of the link LK1 than to the end LK1ed2. Additionally, the joint mechanism JEr3 is near the middle between the ends LK2ed1 and LK2ed2 of the link LK2 (for example, in the intermediate area ARmd2 shown in FIG. 8).

For example, as shown in FIG. 9 (b), the robot controller 30 then controls the joint mechanism JEp2, to move the link LK2 relative to the joint mechanism JEr3 in the −X-direction. That is, the robot controller 30 controls the joint mechanism JEp2, to move the end section TP1 to the −X-direction in a state in which the end surface TP1sf of the end section TP1 is kept horizontal to the ground plane. As a result, the posture of the robot 10A changes from the first posture shown in FIG. 9 (a) to the second posture shown in FIG. 9 (b).

Next, as shown in FIG. 10 (c), the robot controller 30 controls the joint mechanism JEp1, to move the joint mechanism JEr3 along the direction in which the link LK1 extends (the direction De1) to the −Y-direction. That is, the robot controller 30 controls the joint mechanism JEp1, to move the end section TP1 to the −Y-direction in a state in which the end surface TP1sf of the end section TP1 is kept horizontal to the ground plane. As a result, the posture of the robot 10A changes from the second posture shown in FIG. 9 (b) to the third posture shown in FIG. 10 (c).

As shown in FIG. 10 (d), the robot controller 30 then controls the joint mechanism JEp2, to move the link LK2 relative to the joint mechanism JEr3 in the +X-direction, for example. That is, the robot controller 30 controls the joint mechanism JEp2, to move the end section TP1 to the +X-direction in a state in which the end surface TP1sf of the end section TP1 is kept horizontal to the ground plane. As a result, the posture of the robot 10A changes from the third posture shown in FIG. 10 (c) to the fourth posture shown in FIG. 10 (d).

Thus, in the present embodiment, the posture of the robot 10A is changed in the order of the first posture, the second posture, the third posture, and the fourth posture, which enables the end section TP1 to be moved along three sides of a rectangle with a surface horizontal to the ground plane.

In a conventional 6-axis articulated robot, for example, when the end section TP1 is moved to trace three sides of a rectangle with a surface horizontal to the ground plane, an accurate control of four or five of the joint mechanisms JEr is needed. As a result, when the end section TP1 is moved along each side of the rectangle in the conventional 6-axis articulated robot, the number of the joint mechanisms JEr to be driven is increased, and therefore, the operations of the robot are complicated. The complicated operations cause decrease in operating speed, operating accuracy, or the like in a conventional 6-axis articulated robot. In the conventional 6-axis articulated robot, the torque of each joint mechanism JEr, which is driven for moving the end section TP1 along each side of the rectangle, may be limited. This limitation prevents a movement of the end section TP1 at high speed or an increase in the weight capacity.

In contrast, in the present embodiment, driving of only the joint mechanisms JEp1 and JEp2, which correspond to prismatic joints from among the joint mechanisms JE, enables the end section TP1 to be moved along each side of a rectangle, as described above. As a result, in the present embodiment, a decrease in the operating speed or the operating accuracy is prevented. That is, in the present embodiment, it is possible to move the end section TP1 of the robot 10A along each side of a rectangle at high speed with high accuracy. For example, in the present embodiment, the robot 10A can perform tasks, such as welding or applying adhesive along each side of a rectangle, at high speed with high accuracy.

In the present embodiment, since the end section TP1 can be moved on a predetermined plane without driving the joint mechanisms JEr corresponding to rotary joints, a movement of the end section TP1 is not affected by the limitation of the torque of the rotary joints or the like. As a result, in the present embodiment, when the end section TP1 is moved on the predetermined plane, a movement of the end section TP1 at high speed and an increase in the weight capacity are achieved.

In the present embodiment, not only the operations in which the end section TP1 is moved along each side of a rectangle, but also any operations can be implemented by driving only the joint mechanisms JEp1 and JEp2 from among the joint mechanisms JE, as long as the end section TP1 is moved on a plane (XY plane) horizontal to the ground plane in the operations. For example, in the present embodiment, the robot 10A can draw figures with a writing tool held by the end section TP1. A conventional 6-axis articulated robot also remains a challenge similar to a case of the end section TP1 being moved along each side of a rectangle, even when the end section TP1 is moved on a plane horizontal to the ground plane. In the present embodiment, even when the end section TP1 is moved on a plane horizontal to the ground plane, driving of only the joint mechanisms JEp1 and JEp2, which correspond to prismatic joints from among the joint mechanisms JE, enables movement of the end section TP1 at high speed with high accuracy. In the present embodiment, an increase in the weight capacity is achieved, even when the end section TP1 is moved on the plane horizontal to the ground plane.

In the present embodiment, driving of the joint mechanism JEr3 to rotate (turn) the link LK2 relative to the link LK1 enables the end section TP1 to be rotated in the horizontal direction relative to the ground plane. Also in this case, movement of the end section TP1 at high speed with high accuracy and increase in weight capacity are achieved.

The present embodiment provides effects substantially the same as those described above, not only in the operations in which the end section TP1 is moved on the plane (XY plane) horizontal to the ground plane, but also in the operations implemented by driving only the joint mechanisms JEp1 and JEp2 among the joint mechanisms JE. For example, in the present embodiment, as shown in FIG. 11 (b), driving of only the joint mechanisms JEp1 and JEp2 from among the joint mechanisms JE enables the end section TP1 to be moved on a plane (XZ plane or YZ plane) perpendicular to the ground plane. Alternatively, in the present embodiment, as shown in FIG. 11 (c), driving of only the joint mechanisms JEp1 and JEp2 from among the joint mechanisms JE enables the end section TP1 to be moved on the plane inclined to the ground plane.

Figure 11:
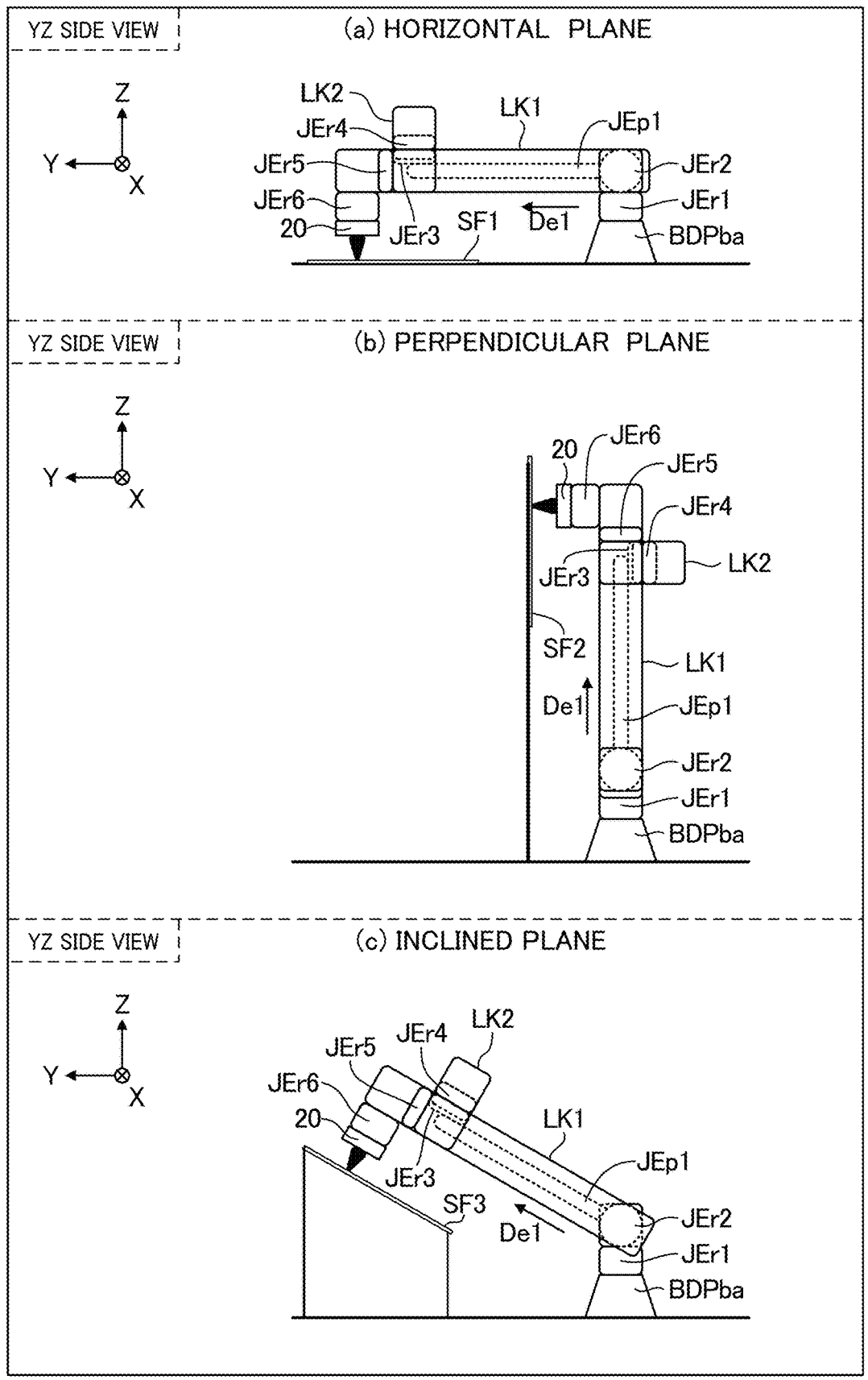
FIG. 11 is an explanatory diagram for operation examples implemented by driving only two joint mechanisms, which correspond to prismatic joints from among the joint mechanisms.

FIG. 11 is an explanatory diagram of an example of an operation implemented by driving only the two joint mechanisms JEp1 and JEp2, corresponding to prismatic joints, from among the joint mechanisms JE. In FIG. 11, states (postures) of the robot 10A viewed from the −X-direction are schematically illustrated.

FIG. 11 (a) schematically illustrates the state (posture) of the robot 10A when the end section TP1 is moved on a plane SF1 (XY plane) horizontal to a ground plane. The posture of the robot 10A shown in FIG. 11 (a) is substantially the same as the first posture shown in FIG. 9 (a). However, a writing tool is attached to the end section TP1 of the robot 10A as the end effector 20. For example, in the present embodiment, change of the posture of the robot 10A to the posture shown in FIG. 11 (a) enables the robot 10A to easily perform a task for drawing figures or the like on the plane SF1 (e.g., the floor surface) horizontal to the ground plane.

FIG. 11 (b) schematically illustrates the state (posture) of the robot 10A when the end section TP1 is moved on a plane SF2 (XZ plane) perpendicular to the ground plane. The posture of the robot 10A is transferred from the posture shown in FIG. 11 (a) to the posture shown in FIG. 11 (b) by driving the joint mechanism JEr2 in such a manner that the link LK1 is perpendicular to the ground plane. For example, in the present embodiment, change of the posture of the robot 10A to the posture shown in FIG. 11 (b) enables the robot 10A to easily perform a task for drawing figures or the like on the plane SF2 (e.g., the wall surface) perpendicular to the ground plane.

FIG. 11 (c) schematically illustrates the state (posture) of the robot 10A when the end section TP1 is moved on a plane SF3 inclined to the ground plane. The plane SF3 is inclined to the plane SF1 shown in FIG. 11 (a) and the plane SF2 shown in FIG. 11 (b). The posture of the robot 10A is transferred from the posture shown in FIG. 11 (a) to the posture shown in FIG. 11 (c) by driving the joint mechanism JEr2 in such a manner that the direction in which the link LK1 extends (the direction De1) is parallel to the plane SF3. For example, in the present embodiment, change of the posture of the robot 10A to the posture shown in FIG. 11 (c) enables the robot 10A to easily perform a task for drawing figures or the like on the plane SF3 inclined to the ground plane.

The plane SF1 horizontal to the ground plane, the plane SF2 perpendicular to the ground plane, and the plane SF3 inclined to the ground plane are examples of a "predetermined plane." In addition, in the examples shown in FIG. 11, driving of the joint mechanism JEr3 to rotate (turn) the link LK2 relative to the link LK1 enables the end section TP1 to be rotated on a predetermined plane, such as the plane SF1. In this case, a movement of the end section TP1 at high speed with high accuracy and an increase in weight capacity are achieved.

Next, a hardware configuration of the robot controller 30 will be described with reference to FIG. 12.

Figure 12:
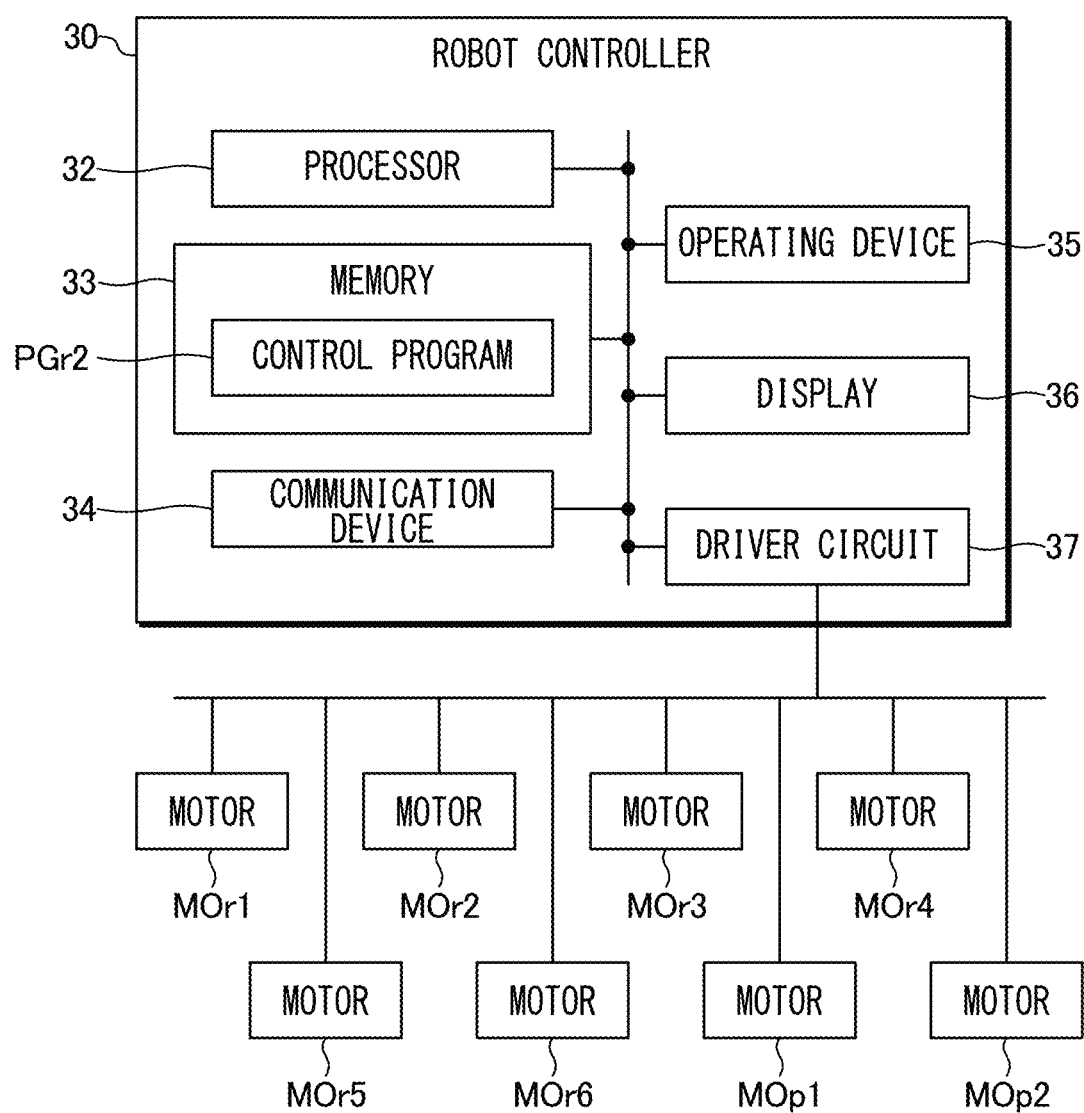
FIG. 12 is a diagram illustrating an example of a hardware configuration of a robot controller shown in FIG. 7.

FIG. 12 is a diagram illustrating an example of the hardware configuration of the robot controller 30 shown in FIG. 7.

The robot controller 30 shown in FIG. 12 is substantially the same as the robot controller 30 shown in FIG. 6. However, a control program PGr2 is stored in the memory 33 in place of the control program PGr shown in FIG. 6. For example, the robot controller 30 includes the processor 32 that controls each part of the robot controller 30, the memory 33 that stores therein a variety of types of information, the communication device 34, the operating device 35 that receives input operations from a human operator, the display 36, and the driver circuit 37.

The memory 33 shown in FIG. 12 stores therein the control program PGr2. In the present embodiment, the control program PGr2 includes an application program for the robot controller 30 to control operations of the robot 10A, for example. However, the control program PGr2 may include an operating robot system program for the processor 32 to control each part of the robot controller 30, for example.

The processor 32 controls operations of the robot 10A by executing the control program PGr2 stored in the memory 33 and operating in accordance with the control program PGr2. The control program PGr2 may be transmitted from another device via a network or the like.

The driver circuit 37 is hardware that outputs a signal for driving the robot 10A to the robot 10A under the control of the processor 32. For example, the driver circuit 37 outputs signals for driving the motors MOr1, MOr2, MOr3, MOr4, MOr5, MOr6, MOp1, and MOp2 to the robot 10A under the control of the processor 32.

Thus, the robot controller 30 controls operations of the robot 10A by controlling the motors MOr1, MOr2, MOr3, MOr4, MOr5, MOr6, MOp1, and MOp2. For example, the robot controller 30 controls operations of the robot 10A by controlling the motors MOr3, MOp1, and MOp2 in such a manner that the end section TP1 of the robot 10A moves along a predetermined plane.

In the foregoing present embodiment, the robot 10A includes (i) the base body BDP, (ii) the end section TP1, (iii) the links LK including the link LK1 and the link LK2 and connecting the base body BDP and the end section TP1 to each other, (iv) the joint mechanism JEr3 that connects the link LK1 and the link LK2 to each other and rotates the link LK2 relative to the link LK1 about the axis Ax3 as the first rotation axis, the axis Ax3 as the first rotation axis forming an angle greater than a predetermined angle with the direction De1 in which the link LK1 extends, (v) the joint mechanism JEp1 that moves the joint mechanism JEr3 relative to the link LK1 along the direction De1, (vi) the joint mechanism JEp2 that moves the link LK2 relative to the joint mechanism JEr3 along the direction De2 in which the link LK2 extends, (vii) the joint mechanism JEr1 that rotates at least a portion of the base body BDP about the axis Ax1 as the second rotation axis, the axis Ax1 as the second rotation axis forming an angle equal to or less than the predetermined angle with the direction Dv1 perpendicular to the bottom BDPbt of the base body BDP, and (viii) the joint mechanism JEr2 that connects the base body BDP and the link LK1 to each other and rotates the link LK1 about the axis Ax2 as the third rotation axis, the axis Ax2 as the third rotation axis forming an angle greater than the predetermined angle with the direction Dv1 perpendicular to the bottom BDPbt of the base body BDP. In plan view from the direction De1, the direction Dax3 along the first rotation axis (the axis Ax3) and the direction Dax2 along the third rotation axis (the axis Ax2) cross each other at a first angle equal to or greater than the predetermined angle.

Thus, in the present embodiment, the joint mechanism JEp1 moves the joint mechanism JEr3 along the direction De1 relative to the link LK1. The joint mechanism JEp2 moves the link LK2 along the direction De2 relative to the joint mechanism JEr3. As a result, in the present embodiment, a movement of the end section TP1 of the robot 10A to the vicinity of the base body BDP is achieved by simple control. In the present embodiment, decreasing the substantial link lengths of the links LK1 and LK2 enables control of the end section of an articulated robot with high accuracy without reducing the working area of the articulated robot even in the vicinity of the base.

In the present embodiment, the direction Dax3 along the first rotation axis (the axis Ax3) and the direction Dax2 along the third rotation axis (the axis Ax2) cross each other at the first angle in plan view from the direction De1. As a result, in the present embodiment, the angle between the turning surface of the link LK2 and the turning surface of the link LK1 is the first angle. In the present embodiment, drive of only the joint mechanisms JEp1 and JEp2, which correspond to the prismatic joints from among the joint mechanisms JE, enables the end section TP1 to be moved on a plane at the first angle, which is an angle between the turning surface of the link LK1 and the plane. As a result, in the present embodiment, it is possible to move the end section TP1 on the plane at the first angle between the turning surface of the link LK1 and the plane at high speed with high accuracy. In the present embodiment, drive of only the joint mechanisms JEp1 and JEp2 from among the joint mechanisms JE enables the end section TP1 to be moved on the plane at the first angle between the turning surface of the link LK1 and the plane, which increases the weight capacity of the end section TP1.

In the present embodiment, the first angle is substantially 90 degrees. This enables the end section TP1 to be moved with high accuracy on the plane SF1 horizontal to the ground plane of the robot 10A, the plane SF2 perpendicular to the ground plane, or the plane SF3 inclined to the ground plane at high speed. In the present embodiment, driving of only the joint mechanisms JEp1 and JEp2 from among the joint mechanisms JE enables the end section TP1 to be moved on each of the planes SF1, SF2, and SF3, which increases the weight capacity of the end section TP1.

In the present embodiment, the robot 10A further includes the joint mechanism JEr4 that connects the link LK2 and the end section TP1 to each other and rotates the end section TP1 relative to the link LK2. The joint mechanism JEr4 rotates the end section TP1 relative to the link LK2 about the axis Ax4 as the fourth rotation axis. The axis Ax4 forms an angle greater than the predetermined angle with the direction De2. The end section TP1 includes (i) the first portion TP11 connected to the link LK2, (ii) the second portion TP12 connected to the first portion TP11, (iii) the joint mechanism JEr5 that connects the first portion TP11 and the second portion TP12 to each other and rotates the second portion TP12 relative to the first portion TP11 about the axis Ax5 as the fifth rotation axis, the axis Ax5 as the fifth rotation axis forming an angle greater than the predetermined angle with the fourth rotation axis (the axis Ax4), and (iv) the joint mechanism JEr6 that rotates a portion of the end section TP1, to which the end effector 20 is attached, about the axis Ax6 as the sixth rotation axis, the axis Ax6 as the sixth rotation axis forming an angle greater than the predetermined angle with the fifth rotation axis (the axis Ax5). Thus, robot 10A may be achieved by adding the joint mechanisms JEp1 and JEp2 to a 6-axis articulated robot. For example, in the present embodiment, since the end section TP1 includes the joint mechanisms JEr5 and JEr6, the robot 10A can perform a variety of tasks in the vicinity of the base body BDP, or on a predetermined plane by the joint mechanisms JEr4, JEr5, and JEr6, and the like.

In the present embodiment, the robot 10A further includes the motor MOr3 driving the joint mechanism JEr3, the motor MOp1 driving the joint mechanism JEp1, the motor MOp2 driving the joint mechanism JEp2, the motor MOr1 driving the joint mechanism JEr1, and the motor MOr2 driving the joint mechanism JEr2. The joint mechanism JEp1 includes (i) the screw part JEp11 that is disposed within the link LK1, extends in the direction De1, and rotates about an axis as a rotation axis along the direction De1 in association with rotation of the motor MOp1, and (ii) the nut JEp12 that is connected to the joint mechanism JEr3, to which the screw part JEp11 is inserted, and that is moved relative to the screw part JEp11 in association with rotation of the screw part JEp11. The joint mechanism JEp2 includes (i) the screw part JEp21 that is disposed within the link LK2, extends in the direction De2, and rotates about an axis as a rotation axis along the direction De2 in association with rotation of the motor MOp2, and (ii) the nut JEp22 that is connected to the joint mechanism JEr3, to which the screw part JEp21 is inserted, and that is moved relative to the screw part JEp21 in association with rotation of the screw part JEp21. The joint mechanism JEr3 is moved relative to the link LK1 in association with movement of the nut JEp12. The link LK2 is moved relative to the joint mechanism JEr3 in association with movement of the nut JEp22. Thus, in the present embodiment, the joint mechanisms JEp1 and JEp2 are achieved by a simple configuration.

In the present embodiment, the robot controller 30 controls the operations of the robot 10A by controlling the motors MOr3, MOp1, and MOp2 in such a manner that the end section TP1 of the robot 10A moves along the predetermined plane. As described above, in the present embodiment, use of the robot controller 30 enables an easy control of the robot 10A by which the end section TP1 of the robot 10A moves along the predetermined plane.

In the present embodiment, the robot system 1 includes the robot 10A, the end effector 20 attached to the end section TP1, and the robot controller 30 controlling operations of the robot 10A and the end effector 20. The robot controller 30 controls the operations of the robot 10A by controlling the motors MOr3, MOp1, MOp2, MOr1, and MOr2. Thus, in the present embodiment, the robot 10A as follows is used in the robot system 1: moving the end section TP1 along a predetermined plane by simple control and moving the end section TP1 to the vicinity of the base body BDP by simple control. As a result, in the present embodiment, a task is efficiently performed on the predetermined plane. Alternatively, in the present embodiment, an efficient performance of complicated work, as well as for a simple task, is achieved, even in a narrow space in the vicinity of the base body BDP. For example, the robot system 1 may be used for a method for manufacturing an object, and the method may include assembling or removing components. In this case, a task for assembling or removing components is achieved efficiently.

3. Modifications

The present invention is not limited to the foregoing embodiments. Specific modifications will be exemplified below. Two or more of the modes optionally selected from the following modifications may be combined with one another.

First Modification

In the foregoing embodiments, an example is given in which the joint mechanism JEr4 rotates the end section TP1 relative to the link LK2 about the axis Ax4 as a rotation axis. The axis AX4 is perpendicular to the direction De2 in which the link LK2 extends. However, the present invention is not limited to such an example. For example, the joint mechanism JEr4 may rotate the end section TP1 relative to the link LK2 about an axis as a rotation axis. The axis forms an angle equal to or less than a predetermined angle with the direction De2 in which the link LK2 extends.

Figure 13:
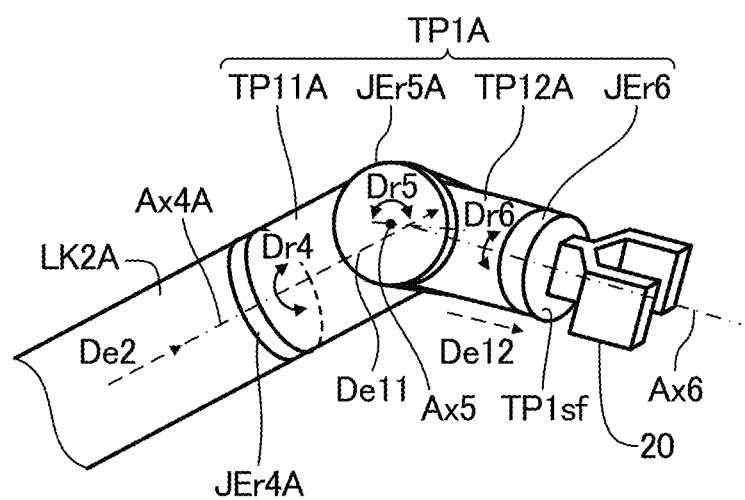
FIG. 13 is an explanatory diagram for an example of an end section according to a first modification.

FIG. 13 is an explanatory diagram for an example of an end section TP1A according to a first modification. Elements substantially the same as those described in FIGS. 1 to 6 are denoted by like reference signs, and detailed explanations thereof are omitted.

For example, the robot 10 or 10A according to the present modification is substantially the same as the robot 10 shown in FIG. 1, or the robot 10A shown in FIG. 7. However, the robot 10 or 10A includes a link LK2A, a joint mechanism JEr4A, and the end section TP1A in place of the link LK2, the joint mechanism JEr4, and the end section TP1 shown in FIG. 1 or 7. The link LK2A is substantially the same as the link LK2 except that the joint mechanism JEr4A is connected thereto in place of the joint mechanism JEr4. The link LK2A is another example of the "second link," and the joint mechanism JEr4A is another example of the "fourth driving mechanism."

The joint mechanism JEr4A connects the link LK2A and the end section TP1A to each other. The joint mechanism JEr4A rotates the end section TP1A relative to the link LK2A about an axis Ax4A (rotation axis) parallel to the direction De2. A rotational direction Dr4 shown in FIG. 13 indicates the rotational direction of the end section TP1A when the end section TP1A is rotated about the axis Ax4A as a rotation axis. The axis Ax4A is another example of the "fourth rotation axis." The axis Ax4A corresponds to an axis that forms an angle equal to or less than a predetermined angle with the direction De2 in which the link LK2A extends.

In the end section TP1A, the end effector 20 is attached to the end surface TP1sf, as in the end section TP1 shown in FIGS. 1 and 7. The end section TP1A includes a first portion TP11A connected to the link LK2A, a second portion TP12A connected to the first portion TP11A, a joint mechanism JEr5A, and the joint mechanism JEr6. The first portion TP11A is connected to the link LK2A, for example, via the joint mechanism JEr4A. As a result, the first portion TP11A is rotated relative to the link LK2A about the axis Ax4A as a rotation axis.

The joint mechanism JEr5A connects the first portion TP11A and the second portion TP12A to each other. The joint mechanism JEr5A rotates the second portion TP12A relative to the first portion TP11A about the axis Ax5 perpendicular to the axis Ax4A. A rotational direction Dr5 shown in FIG. 13 indicates the rotational direction of the second portion TP12A when the second portion TP12A is rotated about the axis Ax5 as a rotation axis. The joint mechanism JEr5A is another example of the "fifth driving mechanism."

The joint mechanism JEr6 is substantially the same as the joint mechanism JEr6 shown in FIGS. 1 and 7. For example, the joint mechanism JEr6 rotates at least a portion (e.g., the end surface TP1sf) of the end section TP1A about the axis Ax6 (rotation axis) perpendicular to the axis Ax5. In the example shown in FIG. 13, a surface of the joint mechanism JEr6 corresponds to the end surface TP1sf, as in the joint mechanism JEr6 shown in FIGS. 1 and 7. In a configuration in which the joint mechanism JEr6 is included in the second portion TP12A and the like, an end surface of the second portion TP12A may be the end surface TP1sf.

In the foregoing modification, the joint mechanism JEr4A rotates the end section TP1A relative to the link LK2A about the axis Ax4A as the fourth rotation axis. The axis Ax4A forms an angle equal to or less than a predetermined angle with the direction De2. The end section TP1A includes the first portion TP11A connected to the link LK2A, the second portion TP12A connected to the first portion TP11A, the joint mechanism JEr5A, and the joint mechanism JEr6. The joint mechanism JEr5A connects the first portion TP11A and the second portion TP12A to each other. The joint mechanism JEr5A rotates the second portion TP12A relative to the first portion TP11A about the axis Ax5 as the fifth rotation axis. The axis Ax5 as the fifth rotation axis forms an angle greater than the predetermined angle with the fourth rotation axis (the axis Ax4A). The joint mechanism JEr6 rotates a portion (e.g., the end surface TP1sf) of the end section TP1A, to which the end effector 20 is attached, about the axis Ax6 as the sixth rotation axis. The axis Ax6 as the sixth rotation axis forms an angle greater than the predetermined angle with the fifth rotation axis (the axis Ax5).

The present modification provides substantially the same effects as those of the above embodiments. For example, since the end section TP1A includes the joint mechanisms JEr5A and JEr6, the robot 10 or 10A can perform a variety of tasks in the vicinity of the base body BDP or on a predetermined plane by the joint mechanisms JEr4, JEr5A, JEr6, and the like.

Second Modification

In the foregoing embodiments and modification, an example is given in which the motor MOr3 for driving the joint mechanism JEr3 is moved integrally with the joint mechanism JEr3. However, the present invention is not limited thereto. For example, the motor MOr3 may be fixed to a predetermined position in the link LK1 so as to allow the joint mechanism JEr3 to be driven even when the position of the joint mechanism JEr3 relative to the link LK1 is changed. The present modification provides substantially the same effects as those in the foregoing embodiments and modification.

Third Modification

In the foregoing embodiments and modifications, an example is given of the configuration of the robot 10 or 10A in which the two joint mechanisms JEp1 and JEp2 are added to a 6-axis articulated robot. However, the present invention is not limited thereto. For example, the robot 10 or 10A may have a configuration in which the two joint mechanisms JEp1 and JEp2 are added to an articulated robot with seven or more axes. Specifically, one or more links LK different from the links LK1 and LK2 may be disposed between the base body BDP and the joint mechanism JEr2. Alternatively, one or more links LK different from the links LK1 and LK2 may be arranged between the joint mechanism JEr4 and the end section TP1. That is, the robot 10 or 10A may include three or more links LK connecting the base body BDP and the end section TP1 to each other. In this case, the three or more links LK included in the robot 10 correspond to the links LK including the links LK1 and LK2.

The present modification provides substantially the same effects as those in the foregoing embodiments and modifications.

4. Application Example

The robot system 1 including the robot 10 according to the embodiments and modifications may be used for a method of manufacturing an object, the method including assembling or removing components.

5. Others Matters

Some examples will be given of "turning" and "rotation," which are distinguished from each other, as briefly described in the foregoing embodiments.

Figure 14:
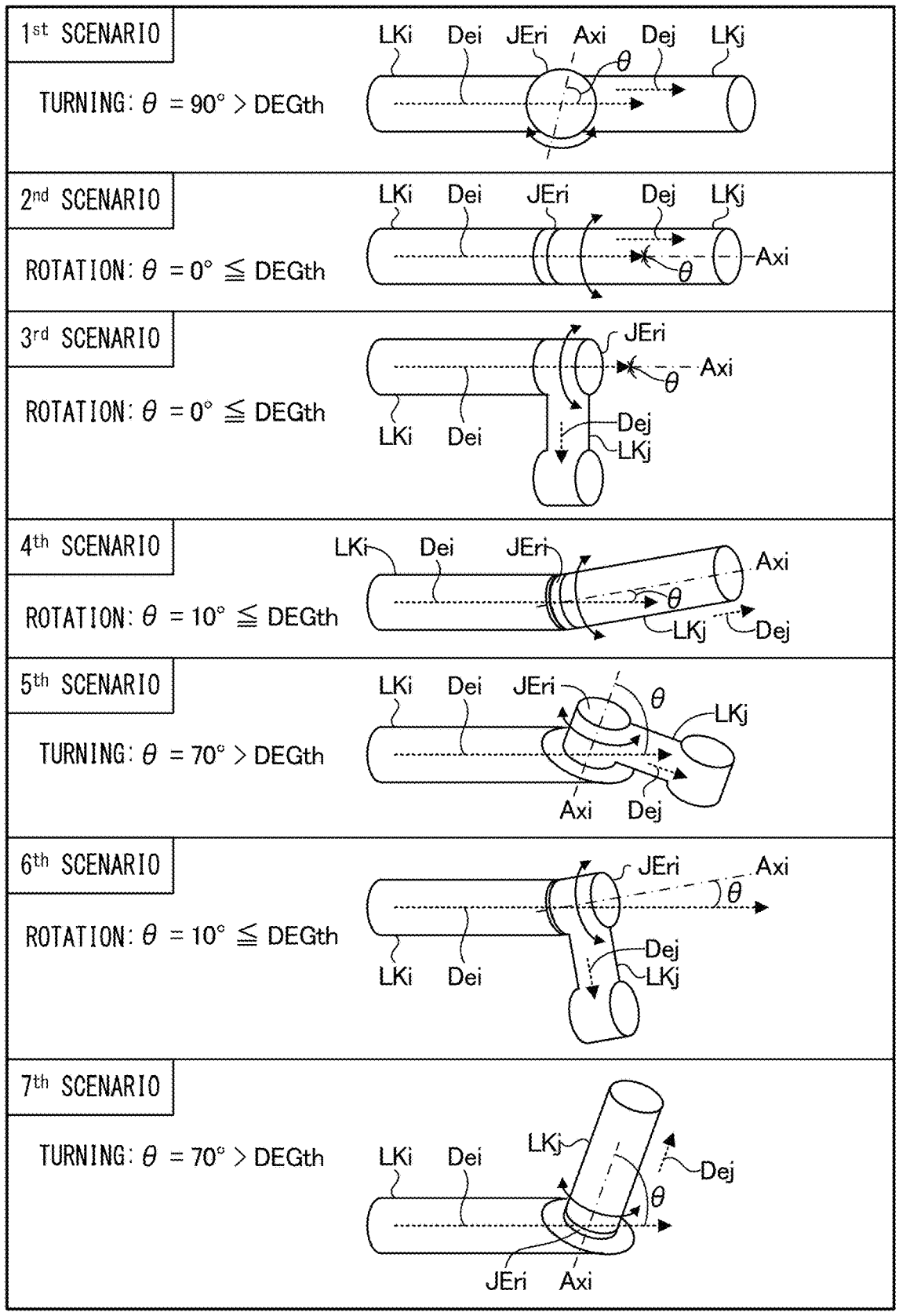
FIG. 14 is an explanatory diagram for examples of "turning."

FIG. 14 is an explanatory diagram for examples of "turning." In FIG. 14, "turning" and "rotation," which are distinguished from each other, will be described with reference to connection between two links LKi and LKj in the longitudinal direction. As shown in FIG. 14, an extending direction Dei indicates the direction in which the link LKi extends. An extending direction Dej indicates the direction in which the LKj extends. A joint mechanism JEri shown in FIG. 14 connects the link LKi and the link LKj to each other. The joint mechanism JEri rotates the link LKj relative to the link LKi about an axis Axi (as a rotation axis).

In the example illustrated shown in FIG. 14, when an angle θ is greater than a predetermined angle, rotation about the axis Axi means "turning." The angle θ is formed between the direction Dei in which the link LKi extends (a specific direction) and the axis Axi. That is, when the angle θ (which is formed between the direction Dei in which the link LKi extends and the axis Axi) is equal to or less than the predetermined angle, rotation about the axis Axi means "rotation other than turning (rotation distinguished from turning)." The "rotation" shown in FIG. 14 represents "rotation other than turning." Although the predetermined angle is not limited to any particular angle, it is envisaged that the predetermined angle is 45° as shown in FIG. 14. The angle θ (which is formed between the extending direction Dei and the axis Axi) is 0° or more and 90° or less. The angle θ is one of the angles that are recognized as the angle of the axis Axi relative to the extending direction Dei (e.g., four angles formed by two straight lines crossing each other, or 0° and 180° formed by two straight lines parallel to each other).

In a first scenario shown, the angle θ (which is formed between the direction Dei in which the link LKi extends and the axis Axi) is 90° and is greater than the predetermined angle (45°). Rotation of the link LKj about the axis Axi means "turning" in the first scenario. In the first scenario, the direction Dej in which the link LKj extends is perpendicular to the axis Axi. In the first scenario, when the link LKj is rotated (turned) about the axis Axi as a rotation axis, an angle is changed which is formed between the direction Dej in which the link LKj extends and the direction Dei in which the link LKi extends.

In a second scenario, the angle θ (which is formed between the direction Dei in which the link LKi extends and the axis Axi) is 0° and is equal to or less than the predetermined angle (45°). As a result, rotation of the link LKj about the axis Axi as a rotation angle means "rotation other than turning" in the second scenario. In the second scenario, the direction Dej in which the link LKj extends is parallel to both the direction Dei in which the link LKi extends and the axis Axi. That is, an angle, which is formed between the direction Dej in which the link LKj extends to the direction Dei in which the link LKi extends, is 0°. In the second scenario, the angle is maintained at 0°, and this is constant even when the link LKj is rotated about the axis Axi as a rotation axis.

In a third scenario, the angle θ (which is formed between the direction Dei in which the link LKi extends and the axis Axi) is 0° and is equal to or less than the predetermined angle (45°). As a result, in the third scenario, rotation of the link LKj about the axis Axi as a rotation axis means "rotation other than turning." In the third scenario, the direction Dej in which the link LKj extends is perpendicular to both the direction Dei in which the link LKi extends and the axis Axi. That is, the angle (which is formed between the direction Dej in which the link LKj extends and the direction Dei in which the link LKi extends) is 90°. In the third scenario, the angle is maintained at 90° and is constant, even when the link LKj is rotated about the axis Axi as a rotation axis.

In a fourth scenario, the angle θ (which is formed between the direction Dei in which the link LKi extends and the axis Axi) is 10° and is equal to or less than the predetermined angle (45°). As a result, rotation of the link LKj about the axis Axi means "rotation other than turning" in the fourth scenario. In the fourth scenario, the direction Dej in which the link LKj extends is parallel to the axis Axi. The angle (which is formed between the direction Dej in which the link LKj extends and the direction Dei in which the link LKi extends) is 10°. In the fourth scenario, the angle is maintained at 10° and is constant, even when the link LKj is rotated about the axis Axi as a rotation axis.

In a fifth scenario, the angle θ (which is formed between the direction Dei in which the link LKi extends and the axis Axi) is 70° and is greater than the predetermined angle (45°). As a result, in the fifth scenario, rotation of the link LKj about the axis Axi means "turning," and the direction Dej in which the link LKj extends is perpendicular to the axis Axi. In the fifth scenario, when the link LKj is rotated (turned) about the axis Axi as a rotation axis, the angle, which is formed between the direction Dej in which the link LKj extends and the direction Dei in which the link LKi extends, changes.

In a sixth scenario, the angle θ (which is formed between the direction Dei in which the link LKi extends and the axis Axi) is 10° and is equal to or less than the predetermined angle (45°). As a result, in the sixth scenario, rotation of the link LKj about the axis Axi as a rotation axis means "rotation other than turning," and the direction Dej in which the link LKj extends is perpendicular to the axis Axi. In the sixth scenario, when the link LKj is rotated about the axis Axi as a rotation axis, the angle (which is formed between the direction Dej in which the link LKj extends and the direction Dei in which the link LKi extends) changes.

In a seventh scenario, the angle θ (which is formed between the direction Dei in which the link LKi extends and the axis Axi) is 70° and is greater than the predetermined angle (45°). As a result, in the seventh scenario, rotation of the link LKj about the axis Axi means "turning." Furthermore, in the seventh scenario, the direction Dej in which the link LKj extends is parallel to the axis Axi. The angle, which is formed between the direction Dej in which the link LKj extends and the direction Dei in which the link LKi extends, is 70°. In the seventh scenario, the angle is maintained at 70° and is constant, even when the link LKj is rotated about the axis Axi as a rotation axis.

Thus, in the foregoing embodiments and modifications, rotation called "turning" is rotation about the axis Axi that is one of a variety of types of rotation of the link LKj relative to the link LKi and forms an angle greater than the predetermined angle with the direction Dei in which the link LKi extends. However, the definition of "turning" is not limited to such examples. For example, when the foregoing definition (rotation about the axis Axi, which forms an angle greater than the predetermined angle with the direction Dei in which the link LKi extends, is "turning") is referred to as a first definition, the following second definition or third definition may be employed in place of the first definition.

In the second definition, when the angle, which is formed between the direction Dej in which the link LKj extends and the direction Dei in which the link LKi extends, changes by rotation of the link LKj relative to the link LKi, such a rotation means "turning." As a result, in the second definition, when the angle is constant even if the link LKj is rotated, such a rotation means "rotation other than turning." For example, in the second definition, the first, fifth, and sixth scenarios shown in FIG. 14 means "turning." The second, third, fourth, and seventh scenarios means "rotation other than turning."

In the third definition, when the angle, which is formed between the direction Dej in which the link LKj extends and the rotation axis (the axis Axi) of the link LKj, is greater than a predetermined angle, such rotation means "turning." As a result, in the third definition, when the angle is equal to or less than the predetermined angle, such rotation means "rotation other than turning." For example, in the third definition, the first, third, fifth, and sixth scenarios shown in FIG. 14 means "turning." The second, fourth, and seventh scenarios means "rotation other than turning."

Separately from the first, second, and third definitions, a relative relationship between two types of rotation by two joint mechanisms JEr adjacent to each other may be defined based on a relationship between rotation axes of the two joint mechanisms JEr. Specifically, when an angle between the two rotation axes is equal to or less than a predetermined angle (typically, the two rotation axes are parallel to each other), the two types of rotation may be defined as the same type of rotation. When the angle is greater than the predetermined angle (typically, the two rotation axes are perpendicular to each other), the two type of rotation may be defined as different types of rotation. The phrase "the same type of rotation" means that both the two types of rotation are "turning" or both the two types of rotation are "rotation other than turning." The phrase "the different types of rotation" means that one of the two types of rotation is "turning," and the other is "rotation other than turning." When the definition of the relative relationships between the two types of rotation is used, rotation serving as the origin of the relative relation may be determined based on, for example, any of the first, second, and third definitions. The first scenario shown in FIG. 14 corresponds to "turning" in all of the first, second, and third definitions. The second scenario corresponds to "rotation other than turning" in all of the first, second, and third definitions. As a result, it is preferable that the first or second scenario be used as rotation serving as the origin of the relative relation.

A definition obtained by combining two or more of the first, second, and third definitions may be used. In this case, for example, only rotation corresponding to turning in all of the two or more definitions to be combined may be "turning." Alternatively, "rotation corresponding to turning" in at least one of the two or more definitions to be combined may be "turning."

DESCRIPTION OF REFERENCE SIGNS

1 . . . robot system, 10, 10A . . . robot, 20 . . . end effector, 30 . . . robot controller, 32 . . . processor, 33 . . . memory, 34 . . . communication device, 35 . . . operating device, 36 . . . display, 37 . . . driver circuit, Ax1, Ax2, Ax3, Ax3z, Ax4, Ax4A, Ax5, Ax6, Axi . . . axis, BDP . . . base body, BDPbt . . . bottom, BDPba . . . base part, GD . . . object, JEr1, JEr2, JEr3, JEr4, JEr4A, JEr5, JEr5A, JEr6, JEri, JEp1, JEp2 . . . joint mechanism, JEp11, JEp21 . . . screw part, JEp12, JEp22 . . . nut, JEp13, JEp23 . . . connection part, JEp13a, JEp23a . . . slider part, JEp13b, JEp23b . . . support, JEp14, JEp24 . . . rail, JEp14a, JEp14b, JEp24a, JEp24b . . . rod-shaped member, JEr11, JEr21, JEr41, JEr51, JEr61 . . . rotating part, JEr12, JEr22, JEr42, JEr52, JEr62 . . . housing, LK1, LK2, LK2A, LKi, LKj . . . link, MOr1, MOr2, MOr3, MOr4, MOr5, MOr6, MOp1, MOp2 . . . motor, WB . . . workbench.

What is claimed is:
1. An articulated robot comprising:
a base;
an end section;
a plurality of link structures including a first link structure and a second link structure and connecting the base and the end section to each other;
a first rotary joint that connects the first link structure to the second link structure and rotates the second link structure about a first rotation axis that forms a first angle greater than a threshold angle with a first direction in which the first link structure extends;
a first prismatic joint that moves the first rotary joint relative to the first link structure along the first direction;
a second prismatic joint that moves the second link structure relative to the first rotary joint along a second direction in which the second link structure extends;
a second rotary joint that rotates at least a portion of the base about a second rotation axis, the axis that forms a second angle with a direction perpendicular to a bottom of the base, the second angle being equal to or less than the threshold angle;
a third rotary joint that connects the base to the first link structure and rotates the first link structure about a third rotation axis that forms a third angle with the direction perpendicular to the bottom of the base, the third angle being greater than the threshold angle; and
a fourth rotary joint that connects the second link structure to the end section and rotates the end section relative to the second link structure;
a first motor that drives the first rotary joint;
a second motor that drives the first prismatic joint; and
a third motor that drives the second prismatic joint,
the first prismatic joint includes:

a first screw that extends in the first direction and rotates along the first direction in association with rotation of the second motor; and a first nut that is connected to the first rotary joint, into which the first screw is inserted, the first screw and the first nut operating together to move the first rotary joint relative to the first link structure along the first direction, the second prismatic joint includes:

a second screw that extends in the second direction and rotates along the second direction association with rotation of the third motor; and a second nut that is connected to the first rotary joint, into which the second screw is inserted, the second screw and the second nut operating together to move the second link structure along the second direction in which the second link structure extends, the first rotary joint moves relative to the first link structure with a movement of the first nut, and the second link structure moves relative to the first rotary joint with a movement of the second nut.

2. The articulated robot according to claim 1, wherein:

the fourth rotary joint rotates the end section relative to the second link structure about an axis as a fourth rotation axis, the axis as the fourth rotation axis forming an angle greater than the predetermined angle with the second direction, and the end section includes:

a first portion connected to the second link structure;
a second portion connected to the first portion;
a fifth rotary joint connecting the first portion and the second portion to each other, the fifth rotary joint rotating the second portion relative to the first portion about an axis as a fifth rotation axis, the axis as the fifth rotation axis forming an angle greater than the predetermined angle with the fourth rotation axis; and a sixth rotary joint that rotates a portion of the end section, to which an end effector is attached, about an axis as a sixth rotation axis, the axis as the sixth rotation axis forming an angle greater than the predetermined angle with the fifth rotation axis.

3. The articulated robot according to claim 1, wherein:

the fourth rotary joint rotates the end section relative to the second link structure about an axis as a fourth rotation axis, the axis as the fourth rotation axis forming an angle equal to or less than the predetermined angle with the second direction, and the end section includes:

a first portion connected to the second link structure;
a second portion connected to the first portion;
a fifth rotary joint connecting the first portion and the second portion to each other, the fifth rotary joint rotating the second portion relative to the first portion about an axis as a fifth rotation axis, the axis as the fifth rotation axis forming an angle greater than the predetermined angle with the fourth rotation axis; and a sixth rotary joint that rotates a portion of the end section, to which an end effector is attached, about an axis as a sixth rotation axis, the axis as the sixth rotation axis forming an angle greater than the predetermined angle with the fifth rotation axis.

4. The articulated robot according to claim 1, wherein:

the first link structure and the second link structure are transferred to a first state, and the first state is a state in which:

the first rotation axis is located closer to a first end of two ends of the first link structure, wherein the first end is an end closer to the base than to a second end of the two ends of the first link structure that is farther from the base; and the first rotation axis is located closer to a first end of two ends of the second link structure, wherein the first end is an end closer to the end section than to a second end of the two ends of the second link structure that is farther from the end section.

5. The articulated robot according to claim 1, wherein:

the first link structure and the second link structure are transferred to a second state, and the second state is a state in which:

the first direction and the second direction are parallel to the second rotation axis; and an end of two ends of the second link structure that is farther from the end section is located closer to a first end of two ends of the first link structure, wherein the first end is an end closer to the base than to a second end of the two ends of the first link structure that is farther from the base.

6. A method for controlling an articulated robot according to claim 1, wherein a controller includes a memory storing a control program, and a processor that accesses the memory and executes the control program to cause the processor to control operations of the articulated robot controls the first motor, the second motor, and the third motor to control operations of the articulated robot.

7. A robot system comprising:

an articulated robot according to claim 1;
an end effector attached to the end section; and
a controller that includes a memory storing a control program, and a processor that access the memory and executes the control program to cause the one or more processor to control operations of the articulated robot and the end effector, wherein the controller controls the first motor, the second motor, and the third motor to control the operations of the articulated robot.

8. A method for manufacturing an object by a robot system including an articulated robot comprising:

a base;
an end section;
a plurality of link structures including a first link structure and a second link structure and connecting the base and the end section to each other;
a first rotary joint that connects the first link structure to the second link structure and rotates the second link structure about a first rotation axis that forms a first angle greater than a threshold angle with a first direction in which the first link structure extends;
a first prismatic joint that moves the first rotary joint relative to the first link structure along the first direction;
a second prismatic joint that moves the second link structure relative to the first rotary joint along a second direction in which the second link structure extends;
a second rotary joint that rotates at least a portion of the base about a second rotation axis, the axis that forms a second angle with a direction perpendicular to a bottom of the base, the second angle being equal to or less than the threshold angle;
a third rotary joint that connects the base to the first link structure and rotates the first link structure about a third rotation axis that forms a third angle with the direction perpendicular to the bottom of the base, the third angle being greater than the threshold angle;
a fourth rotary joint that connects the second link structure to the end section and rotates the end section relative to the second link structure;
a first motor that drives the first rotary joint;
a second motor that drives the first prismatic joint;
a third motor that drives the second prismatic joint,
wherein the first prismatic joint includes:
- a first screw that extends in the first direction and rotates along the first direction in association with rotation of the second motor; and
- a first nut that is connected to the first rotary joint, into which the first screw is inserted, the first screw and the first nut operating together to move the first rotary joint relative to the first link structure along the first direction, wherein the second prismatic joint includes:
- a second screw that extends in the second direction and rotates along the second direction association with rotation of the third motor; and
- a second nut that is connected to the first rotary joint, into which the second screw is inserted, the second screw and the second nut operating together to move the second link structure along the second direction in which the second link structure extends, wherein the first rotary joint moves relative to the first link structure with a movement of the first nut, and
wherein the second link structure moves relative to the first rotary joint with a movement of the second nut;
an end effector attached to the end section; and
a controller that includes a memory storing a control program, and a processor that access the memory and executes the control program to cause the processor to control the first motor, the second motor, and the third motor to control operations of the articulated robot and the end effector,
the method comprising:
controlling, by the controller, the first motor, the second motor, and the third motor to control the articulated robot and the end effector to engage the object in order to assemble or remove a component of the object.

9. A robot system comprising:
the articulated robot according to claim 1;
an end effector attached to the end section; and
a controller that includes a memory storing a control program, and a processor that access the memory and executes the control program to cause the one or more processor to control operations of the articulated robot and the end effector,
wherein the controller controls a position of the end effector.

10. The articulated robot according to claim 1, wherein the first prismatic joint is disposed inside the first link structure; and
a second prismatic joint is disposed inside the second link structure.

11. An articulated robot comprising:
a base;
an end section;
a plurality of link structures including a first link structure and a second link structure, the plurality of link structures connecting the base and the end section to each other;
a first rotary joint that connects the first link structure to the second link structure and rotates the second link structure relative to the first link structure about a first rotation axis that forms a first angle greater than a threshold angle with a first direction in which the first link structure extends;
a first prismatic joint that moves the first rotary joint relative to the first link structure along the first direction;
a second prismatic joint that moves the second link structure relative to the first rotary joint along a second direction in which the second link structure extends;
a second rotary joint that rotates at least a portion of the base about a second rotation axis that forms a second angle equal to or less than the threshold angle with a direction perpendicular to a bottom of the base; and
a third rotary joint that connects the base to the first link structure and rotates the first link structure about a third rotation axis that forms a third angle greater than the threshold angle with the direction perpendicular to the bottom of the base,
a fourth rotary joint that connects the second link structure to the end section and rotates the end section relative to the second link structure;
a first motor that drives the first rotary joint;
a second motor that drives the first prismatic joint; and
a third motor that drives the second prismatic joint,
the first prismatic joint includes:
- a first screw that extends in the first direction and rotates along the first direction in association with rotation of the second motor; and
- a first nut that is connected to the first rotary joint, into which the first screw is inserted, the first screw and the first nut operating together to move the first rotary joint relative to the first link structure along the first direction, the second prismatic joint includes:
- a second screw that extends in the second direction and rotates along the second direction association with rotation of the third motor; and
- a second nut that is connected to the first rotary joint, into which the second screw is inserted, the second screw and the second nut operating together to move the second link structure along the second direction in which the second link structure extends, the first rotary joint moves relative to the first link structure with a movement of the first nut, and
the second link structure moves relative to the first rotary joint with a movement of the second nut,
wherein a direction along the first rotation axis and a direction along the third rotation axis cross at a first angle equal to or greater than the threshold angle in plan view from the first direction.

12. The articulated robot according to claim 11, wherein the first angle is substantially 90 degrees.

13. The articulated robot according to claim 12, wherein:
the fourth rotary joint rotates the end section relative to the second link structure about a fourth rotation axis that forms a fourth angle greater than the threshold angle with the second direction, and
the end section includes:
a first portion connected to the second link structure,
a second portion connected to the first portion;
a fifth rotary joint that connects the first portion to the second portion and rotates the second portion relative to the first portion about a fifth rotation axis that forms a fifth angle greater than the threshold angle with the fourth rotation axis; and a sixth rotary joint that rotates a portion of the end section, to which an end effector is attached, about a sixth rotation axis that forms a sixth angle greater than the threshold angle with the fifth rotation axis.

14. The articulated robot according to claim 12, wherein:
the fourth rotary joint rotates the end section relative to the second link structure about a fourth rotation axis that forms a fourth angle equal to or less than the threshold angle with the second direction, and
the end section includes:
   a first portion connected to the second link structure;
   a second portion connected to the first portion;
   a fifth rotary joint that connects the first portion to the second portion and rotates the second portion relative to the first portion about a fifth rotation angle that forms a fifth angle greater than the threshold angle with the fourth rotation axis; and
   a sixth rotary joint that rotates a portion of the end section, to which an end effector is attached, about a sixth rotation axis that forms a sixth angle greater than the threshold angle with the fifth rotation axis.

* * * * *